(12) United States Patent
Reza

(10) Patent No.: US 10,204,076 B2
(45) Date of Patent: Feb. 12, 2019

(54) METHOD FOR ANALYZING SIGNALS PROVIDING INSTANTANEOUS FREQUENCIES AND SLIDING FOURIER TRANSFORMS, AND DEVICE FOR ANALYZING SIGNALS

(76) Inventor: Yves Reza, Cormondreche (CH)

( * ) Notice: Subject to any disclaimer, the term of this patent is extended or adjusted under 35 U.S.C. 154(b) by 1254 days.

(21) Appl. No.: 13/816,190

(22) PCT Filed: Aug. 10, 2011

(86) PCT No.: PCT/BE2011/000052
§ 371 (c)(1),
(2), (4) Date: Feb. 8, 2013

(87) PCT Pub. No.: WO2012/019251
PCT Pub. Date: Feb. 16, 2012

(65) Prior Publication Data
US 2013/0138398 A1 May 30, 2013

(30) Foreign Application Priority Data

Aug. 11, 2010 (BE) .................................. 2010/0485

(51) Int. Cl.
*G10L 19/00* (2013.01)
*G06F 17/14* (2006.01)
(Continued)

(52) U.S. Cl.
CPC ............ *G06F 17/14* (2013.01); *G06F 17/141* (2013.01); *G10L 25/48* (2013.01); *G10L 19/008* (2013.01);
(Continued)

(58) Field of Classification Search
CPC ....................................................... G06F 17/14
(Continued)

(56) References Cited

U.S. PATENT DOCUMENTS 3,770,900 A * 11/1973 Morlec .................... H04Q 1/46
379/351
4,555,791 A * 11/1985 Gabillet .................. B61L 3/243
327/82
(Continued)

FOREIGN PATENT DOCUMENTS

CN           1869972 A     11/2006
WO    WO-2009/115211 A2    9/2009

OTHER PUBLICATIONS

Hainsworth et al., "Time Frequency Reassignment: A Review and Analysis," Cambridge University Engineering Department, Cambridge, United Kingdom, 2003, pp. 1-28.
(Continued)

*Primary Examiner* — Mischita Henson
*Assistant Examiner* — Christine Liao
(74) *Attorney, Agent, or Firm* — Marshall, Gerstein & Borun LLP

(57) ABSTRACT

The present invention is relative to a method for analyzing an signal (INS), representative of a wave that propagates in a physical medium, providing characteristic parameters of said signal, said method being implemented on a computing platform (CP), requiring only fixed point computations, and with a reduced number of multiplications. Parameters that are provided can be one or several of the following: instantaneous phase (IP), instantaneous amplitude (IA), instantaneous frequency (IF), Sliding Fourier Transform (STFT).

10 Claims, 17 Drawing Sheets

(51) Int. Cl.
  *G10L 25/48*  (2013.01)
  *G10L 19/008*  (2013.01)
  *G10L 25/90*  (2013.01)
  *H04S 1/00*  (2006.01)
  *G10L 25/24*  (2013.01)

(52) U.S. Cl.
  CPC ............. *G10L 25/24* (2013.01); *G10L 25/90* (2013.01); *H04S 1/007* (2013.01)

(58) Field of Classification Search
  USPC ........................................................ 702/190
  See application file for complete search history.

(56) References Cited

U.S. PATENT DOCUMENTS

| | | | |
|---|---|---|---|
| 4,888,557 A | 12/1989 | Puckette, IV et al. | |
| 6,345,246 B1* | 2/2002 | Moriya | G10L 19/008 704/219 |
| 6,404,302 B1* | 6/2002 | Satoh | H03H 9/6483 333/193 |
| 2003/0088411 A1* | 5/2003 | Ma | G10L 15/20 704/236 |
| 2006/0229878 A1* | 10/2006 | Scheirer | G10H 1/0008 704/273 |
| 2008/0162088 A1* | 7/2008 | DeVaul | A61B 5/0024 702/190 |
| 2010/0161321 A1* | 6/2010 | Oshikiri | G10L 21/038 704/203 |

OTHER PUBLICATIONS

Kodera et al., "Analysis of Time—Varying Signals with Small BT Values," IEEE Transactions on Acoustics, Speech, and Signal Processing, Japan, vol. ASSP-26, No. 1, Feb. 1978, pp. 64-76.
Kuldip et al., "Frequency-Related Representation of Speech," Proceedings Eurospeech 2003, Geneva, Switzerland, Sep. 2003, pp. 65-68.
Lyons, R. G., "Understanding Digital Signal Processing 2nd Ed.," Prentice Hall Professional Technical Reference, New Jersey, Jan. 2004, pp. 358-380.
Nawab et al., "Short-Time Fourier Transform" Chapter 6 in "Advanced Topics in Signal Processing," Prentice Hall, New Jersey, Oct. 1987.
Oppenheim et al., "Signals and Systems," Prentice Hall, New Jersey, 1997, 957 pages.
Reilly et al., "An Efficient Algorithm for Analytic Signal Generation for Time-Frequency Distributions," Proceedings of the International Conference on Acoustics, Speech, and Signal Processing, Brisbane, vol. III, Apr. 1994, pp. 165-166.
Renfors, Markku, "Sampling and Multirate Techniques for Complex and Bandpass Signals," Tampere University of Technology Telecommunications, Finland, Oct. 2002, pp. 1-32.
Tsui, James Bao-Yen, "Digital Techniques for Wideband Receivers," Artech House Publishers, Massachusetts, Jan. 1995.
Valkama et al., "Advanced I/Q Signal Processing for Communication Systems," SDR-03 Technical Conference, Orlando, Nov. 2003, pp. 1-69.
Search Report for BE 201000485 dated Mar. 21, 2011.
Search Report for PCT/BE2011/000052 dated Feb. 16, 2012.

* cited by examiner

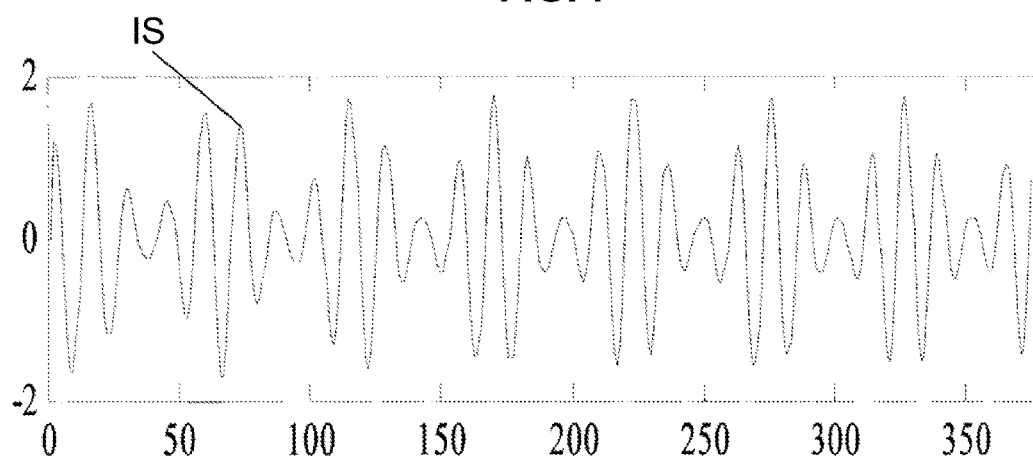
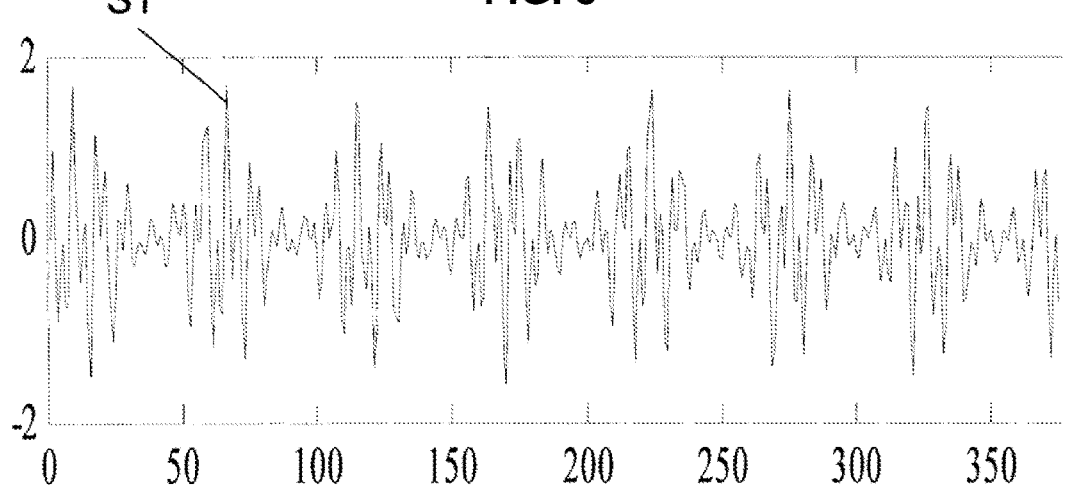

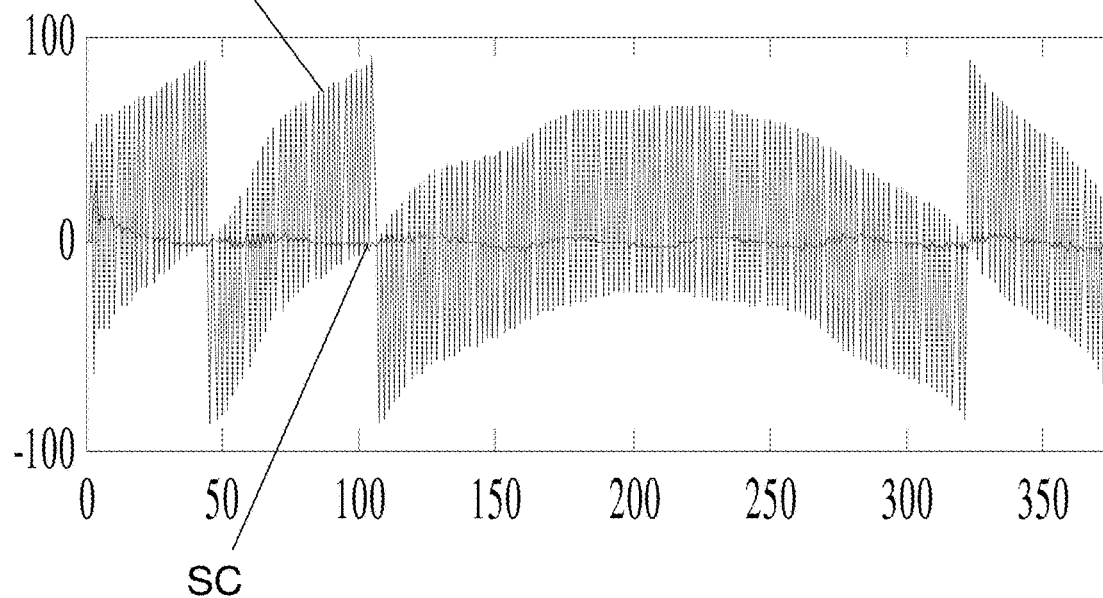
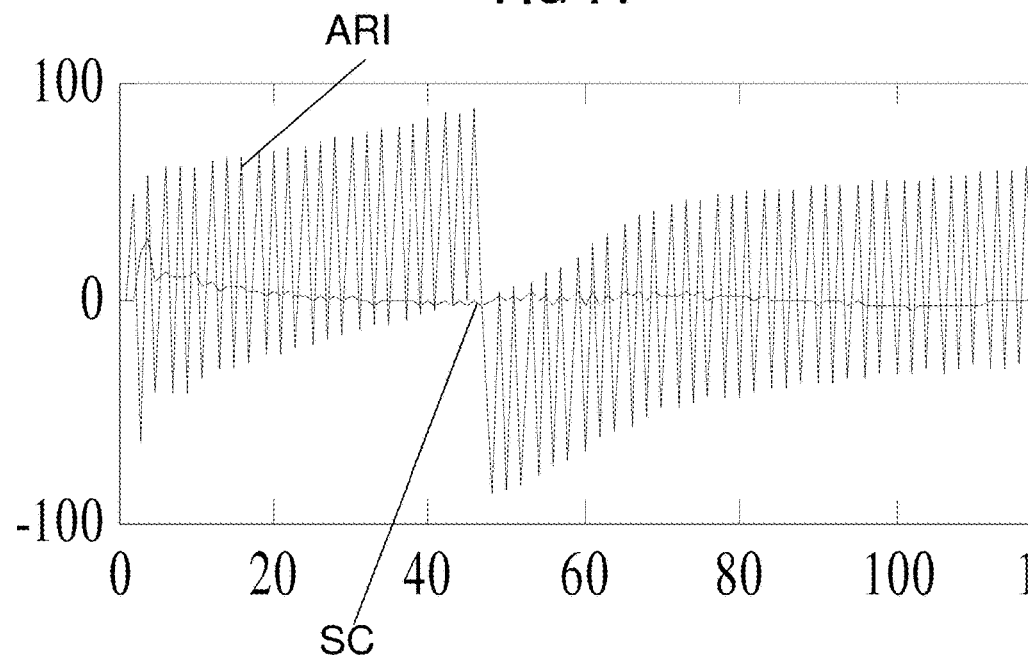

FIG. 23
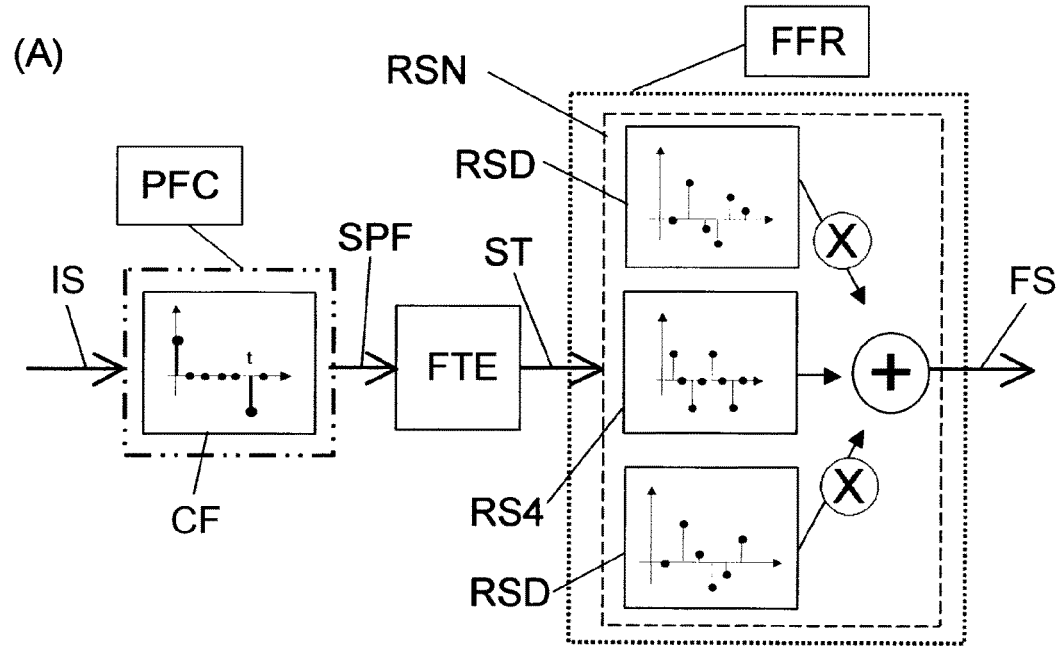
(A)
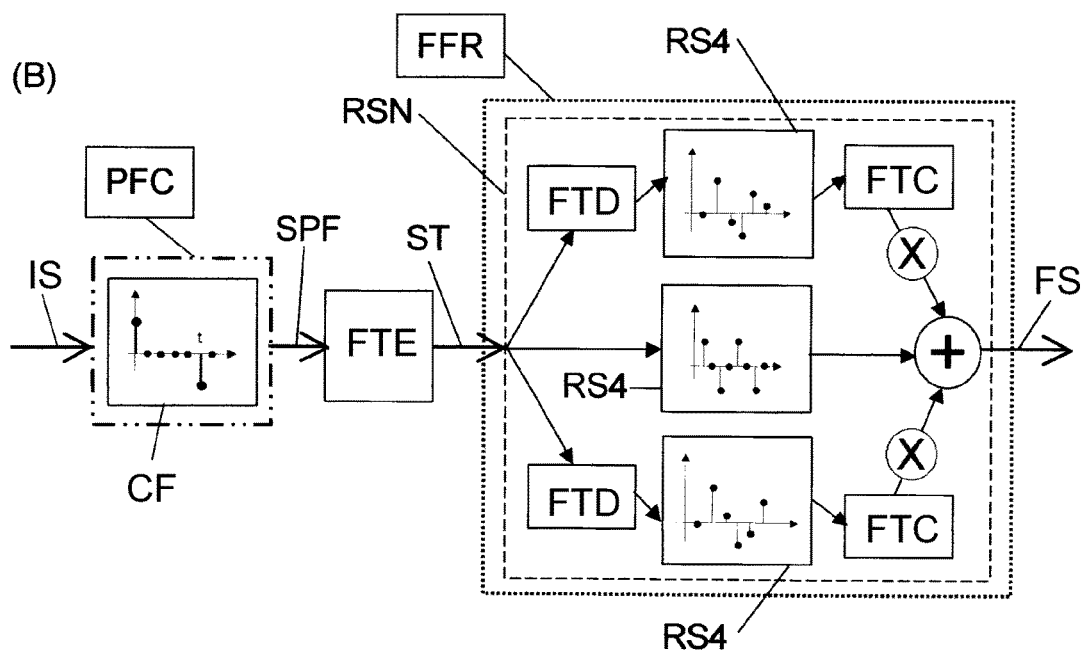
(B)

FIG 24
(A) 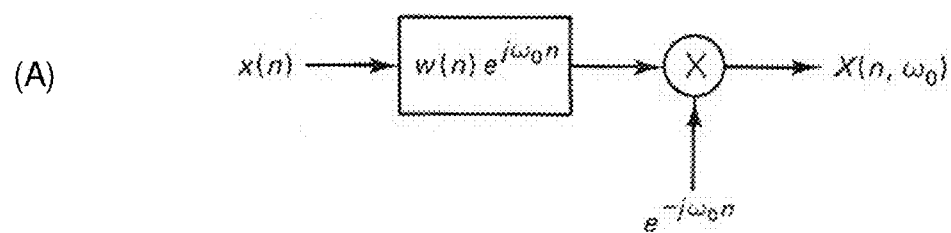
(B) 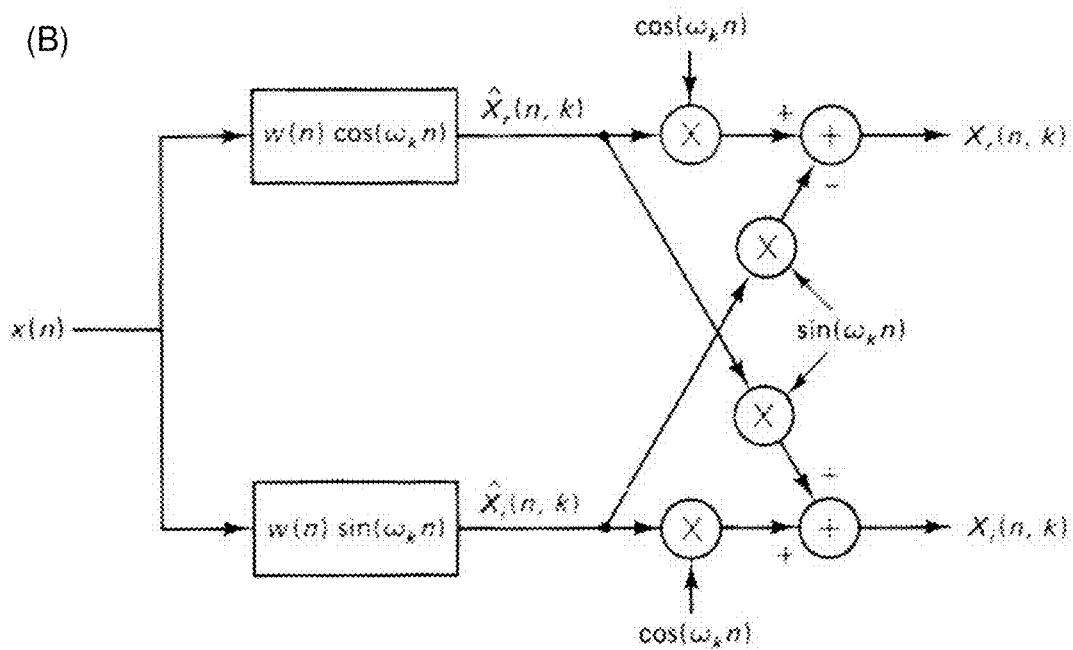

FIG 27
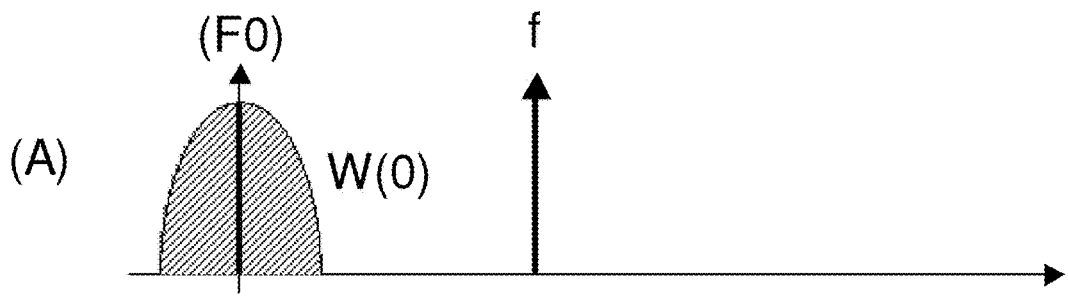
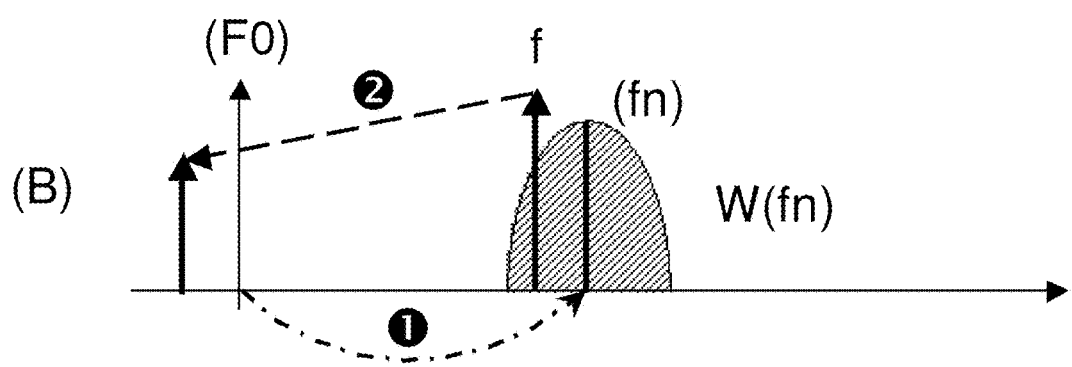
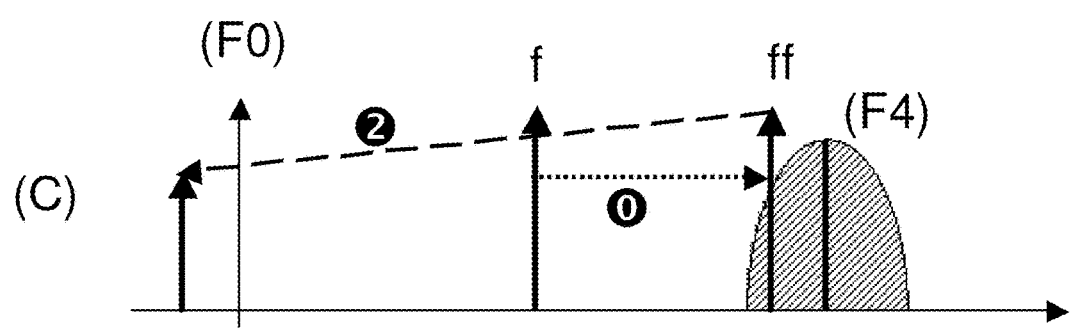

FIG 28

| | Number | FREQUENCY DOMAIN WINDOWING (Figure 23 Part B) | | | | Number | TIME DOMAIN WINDOWING (Figure 21) | | | |
|---|---|---|---|---|---|---|---|---|---|---|
| | | Complex | | Real | | | Complex | | Real | |
| | | Mult | Add | Mult | Add | | Mult | Add | Mult | Add |
| Comb Filter (PE) | 1 | | | | 1 | 4 | | | | 4 |
| Frequency Translation (TFE) to (F4) | 1 | 1 | | 2 | | 1 | 1 | | 2 | |
| Resonator (RS4) at Frequency (F4) | 3 | | 3 | | 6 | 4 | | 4 | | 8 |
| Resonators at frequencies <> (F4) | 4 | 4 | | 8 | | 0 | | | | |
| Multipl by reals after resonators | 3 | 3 | | 6 | | 0 | | | | |
| Sum after multiplication | 2 | | 2 | | 4 | 0 | | | | |
| Frequency Translation (TF0) to (0) | 1 | | 1 | | 2 | 1 | | 1 | | 2 |
| TOTAL | | | | 16 | 13 | | | | 2 | 14 |

| | | | | | | Number | Complex | | Real | |
|---|---|---|---|---|---|---|---|---|---|---|
| | | | | | | | Mult | Add | Mult | Add |
| Comb Filter (PE) | | | | | | 3 | | | | 3 |
| Frequency Translation (TFE) to (F4) | | | | | | 1 | 1 | | 2 | |
| Resonator (RS4) at Frequency (F4) | | | | | | 3 | | 3 | | 6 |
| Resonators at frequencies <> (F4) | | | | | | 0 | | | | |
| Multipl by reals after resonators | | | | | | 0 | | | | |
| Sum after multiplication | | | | | | 0 | | | | |
| Frequency Translation (TF0) to (0) | | | | | | 1 | | 1 | | 2 |
| TOTAL | | | | | | | | | 2 | 11 |
| To compare to : | | | | | | | | | | |
| Réf 1 Table 13-5 "3 term windowed DFT guranteed stable" | | | | 19 | 14 | | | | 19 | 14 |

METHOD FOR ANALYZING SIGNALS PROVIDING INSTANTANEOUS FREQUENCIES AND SLIDING FOURIER TRANSFORMS, AND DEVICE FOR ANALYZING SIGNALS

TECHNOLOGICAL BACKGROUND

Methods for extracting information from audio signals (musical signals and vocal signals in particular) are increasingly important. They are in particular used in an increasing number of applications such as for example: voice recognition, analysis of musical signals, detection of service signals for telephony applications (DTMFs) in presence of voice signals.

More precisely, these applications include a step of extraction of frequency domain information (typically: amplitude and amplitude evolution for narrow frequency bands extracted from the signal), followed by steps of recognition or identification using, often as main information, this frequency domain information. These two steps use different techniques: signal processing for the first, pattern recognition for the second. The step of extraction of frequency domain information is often implemented by means of Sliding Fourier Transform (or Short-Term Fourier Transform).

Within that context, nature and wealth of information gathered during the frequency domain information extraction step play a very significant role for the subsequent step of recognition or identification, and thus for the performance of such applications as a whole.

Audio signal processing is currently mainly done by means of audio filter banks operating in parallel (according to the principle of a vocoder) or, equivalently, of windowed Fourier transforms (that is operating on signals previously multiplied by a window). The audio signal may have been subjected to filtering operations aiming at eliminating or enhancing frequencies, for example for enhancing high frequencies and/or limiting the bandwidth of the signal that will be subject to processing. On the other hand, these processings operate on the usual audio signal without that signal incurring any frequency modification.

As a consequence, these processings operate on the part of the audio frequency band which contains the main part of the information allowing voice recognition or identification of the source, that is a frequency band including the frequency band going from 300 Hz to 3200 Hz (frequency band for telephony). The frequency domain information is obtained with time domain windows with a duration on the order of 10 to 20 milliseconds, duration during which audio signals are assumed to be stationary (or quasi stationary).

This assumption of stationarity or of quasi-stationarity is globally well respected, but prevents from seeing well the transitions between periods during which the signal is stationary (or quasi stationary).

The information associated with each frequency gathered during the extraction of frequencies is frequency and amplitude information regarding:

a) A set of frequencies defined in advance (actually frequency bands with a width defined in advance centered on this set of defined frequencies)

b) A given time window, which typically changes by discontinuous steps

The recognition or identification steps generally use the fact that, at a given instant, or during successive instants, a set of well defined frequencies are present together.

From this perspective, the following factors are thus particularly important:

a) the accuracy with which the frequencies are detected (the width of the frequency band centered around each pre defined frequency) is an important parameter: at least for low frequencies, in particular lower to 800 Hertz approximately, it is important that these frequencies are known with the best possible precision both for amplitude and phase b) the wealth of information associated with each frequency so detected (for example: amplitude, instantaneous frequency, variations in time of that information)

The object of the present invention is to obtain, with simple and economical means such information associated with frequency, and to obtain it continuously.

Such frequency domain information can allow improving performances of applications that comprise such frequency extraction step.

It may also be advantageous to have information related to Sliding Fourier Transform (STFT), in parallel with instantaneous frequency and amplitude information. Indeed, it is advantageous in some applications to be able to make a synthesis of the analyzed signal, in particular after the analyzed signal has been subjected to transformations in the frequency domain, and conditions for invertibility of STFT are known.

It is known that one way of analyzing the result of a STFT on a signal is to notice that executing a STFT is equivalent to make the signal going through a bank of passband filters, which the invention permits. One then notices that the invention permits to get into the conditions under which the STFT is invertible.

One finally notices that, starting from the previous observations according to which the invention allows to make an invertible STFT, it is possible to use the invention to perform a Hilbert transform.

Concerning the electric signals that the invention is able to process, one notices that audio signals are a particular case of electric signals generated by a sensor (S) and representative of physical waves that propagate in a physical medium. As an example of such waves, one can mention: acoustic waves, electromagnetic waves, seismic waves, ultrasound waves, sound waves in a medium other than air (water, human or animal body).

Within the framework of the present invention, we shall be particularly interested in signals generated by sensors (S) which are electrical signals designated as "real," as opposed to signals designated as "complex," which means couples of real signals.

OBJECTIVE OF THE INVENTION

The objective of the invention is to be able to extract from a signal, such as an audio signal or an electric signal generated by a sensor (S) and representative of physical waves:

a) a time-frequency analysis the wealth and quality of which are comparable to those obtained by the reassignment method (see FIGS. 1 and 2)

b) in synchrony with the analyzed signal c) using low cost computing platforms and allowing to manufacture embedded and autonomous devices d) which can be compared to a classical analysis by a Sliding Fourier Transform?

SUMMARY OF THE INVENTION

With this objective, as it will be seen later, the invention proposes an analysis method of an initial signal ((INS), representative of a wave that propagates in a physical medium, in order to provide parameters that are characteristic of the said initial signal, the said method being implemented on a computing platform (CP), by a filter bank implemented by a plurality (N) of frequency selective filters (FSF), with distinct center frequencies (FN), operating on samples of an input signal (IS) obtained by sampling with a constant sampling frequency (SF) the initial signal ((INS), comprising the following steps:

a) Preprocessing operations in order to transform samples of the input signal (IS) into sample sequence (SS)

b) A plurality (N) of frequency translation operations (FTE), each one corresponding to one of the analyzed frequencies (FN) from the plurality (N) of frequencies, each one being adapted to change this frequency (FN) into the frequency (F4), equal to a quarter of the sampling frequency (SF), and providing a plurality (N) of signals (ST) translated in frequency towards the frequency (F4) from the sample sequence (SS)

c) A plurality (N) of frequency selective filtering operations (FSO), operating on each of the signals (ST) translated in frequency from the plurality (N) of these signals, and performed each at frequency (F4) and providing a plurality (N) of filtered signals (FS), each of these filtered signals (FS) having a frequency bandwidth (BF) centered on the frequency (F4)

d) A plurality (N) of extraction operations (EXP) of parameters (PARAM) based on the plurality of filtered signals (FS), including for each of the filtered signals (FS) the estimation of at least one of the parameters among:

Instantaneous phase (IP)
Instantaneous amplitude (IA)
Instantaneous frequency (IF)
Sliding Fourier Transform (STFT)

In preferred implementations of the invention, one or other of the following arrangements can be used:

Step a) comprises a frequency domain filtering and/or an up sampling operation adapted to limit the maximum frequency (FB) of the input signal (IS) to a maximum frequency (FB) less than said frequency (F4)

Sliding Fourier Transform (STFT) is implemented by means of the following additional step:

e) A plurality (N) of frequency translation operations (TF0), operating on the plurality (N) of real filtered signals (FS) having a frequency bandwidth (BF) centered on frequency (F4), each one being adapted to translate frequency (F4) into zero frequency Step c) comprising the plurality (N) of frequency selective filtering operations (FSO) is implemented in two steps:

c1) A prefiltering step (PFO) operating on real input signal before any frequency translation operation (FTE)

c2) A frequency domain filtering step (FDFS) operating on each of the real signals translated in frequency (ST) from the plurality (N) of such signals The prefiltering step (PFO) is implemented by means of a comb filter (CF) or a sequence of (NP) comb filters (CF), and frequency domain filtering step (FDFS) is implemented by means of a plurality of resonators (RS4) or a plurality of sequences of (NUM) resonators (RS4) each tuned on frequency (F4), and in which:

i) For each one of the analyzed frequencies (FN), the number (NP) of comb filters in a sequence of (NP) comb filters (CF) is equal to the number (NUM) of resonators in a sequence of (NUM) resonators (RS4)

ii) The frequency zeroes of the comb filters (CF) include each of the analyzed frequencies (FN) of the plurality (N) of frequencies iii) Each frequency translation operation (FTE), corresponding each to one of the analyzed frequencies (FN) from the plurality (N) of frequencies, is adapted to changing the frequency zeroes of the comb filter (CF) into the frequency (F4) of resonators (RS)

Resonators (RSD), tuned on frequencies (FD) close to (F4) operate in parallel with a resonator (RS4) so as to implement in the frequency domain a time domain windowing, and each resonator (RSD) tuned on a frequency (FD) close to (F4) is replaced by a resonator (RS4) preceded by a frequency translation operation (FTD), adapted to translate frequency (F4) into frequency (FD) of each resonator (RSD) that is replaced and followed by a frequency translation operation (FTC), adapted to translate frequency (FD) to the frequency (F4) or to frequency zero frequency bands (BF) used in frequency selective filtering operations (FSO) have a width adapted so that the sequences of filtered samples (FS) produced as an output of these operations for each frequency (FN) of the plurality (N) of frequencies contain each essentially only one frequency domain component of the input signal (IS)

instantaneous frequency (IF) of a filtered signal (FS) is measured from the difference of successive measures of the instantaneous phase (IP) of filtered signal (FS)

all the operations are executed with a speed adapted to allow a continuous processing of all frequencies (FN) from the plurality of frequencies (F).

It will be moreover advantageous to implement a signal analysis device comprising:

a) a sensor (S) generating an initial signal ((INS)

b) a computing platform (CP) connected to the sensor (S) and adapted to implement the method according to any of the preceding claims, in particular such as the computing platform (CP) is adapted to fixed point computations The invention also concerns a method for selective filtering in the frequency domain implementing a plurality (N) of frequency selective filters (FS) operating in parallel on the same plurality (N) of distinct frequencies (FN), each having a pass band (BF), and operating on samples of an input signal (IS), sampled with a sampling frequency (SF), the pass band of which is comprised between a minimum frequency (FA) and a maximum frequency (FB), and comprising the following steps:

a) An input memorization operation (IMO) memorizing continuously samples of an input signal (IS)

b) An analysis operation (ANA) for one of the frequencies (FN) of the plurality (N) of frequencies, comprising the following steps:

b1) Reading (RD) a sequence (SS) of samples of the input signal (IS) that were memorized during operation (IMO), the length of which is (NM) samples b2) Frequency translation operation (FTE) applied to sequence (SS) of samples from input signal (IS), producing a new sequence (ST) of translated in frequency samples from input signal (IS), of the same length (NM)

b3) Frequency selective filtering (FSO) in frequency applied to sequence (ST) of translated in frequency samples from input signal (IS), with a bandwidth (BF), producing sequences of filtered samples (FS), of the same length (NM)

c) Release operation (RLO) of the memory resource attributed to sequence (SS) of samples of input signal (IS) of length (NM) during the input memorization operation (IMO)

characterized in that:

aa) Analysis operation (ANA) is performed for several of frequencies (FN) of the plurality of frequencies (F), after input memorization operation (IMO) and before release operation (RLO) of the memory resource attributed to sequence (SS) of samples of input signal (IS) the length of which is (NM)

bb) Frequency translation operation (FTE) applied to each analyzed frequency (FN) from plurality (N) of frequency is adapted to change this frequency (FN) into a constant frequency (F4), substantially equal to a quarter of the sampling frequency (SF) of samples of input signal (IS)

cc) Frequency selective operation (FSO) is performed at the constant frequency (F4)

In preferred implementations of the invention, one or other of the following dispositions can be used:

- analysis operation (ANA) is performed at a speed adapted to allow a continuous processing of all frequencies (FN) from the plurality of frequencies (F)
- frequency bands (BF) used in frequency selective filtering operations (FSO) have a width adapted so that sequences of filtered samples (FS) produced as outputs of these operations for each frequency (FN) of the plurality of frequencies contain each essentially only one frequency domain component of the input signal (IS)
- the method is preceded by an operation (CFS) of change of the sampling frequency of the input signal
- the method is preceded by an operation (SFF) of selective frequency filtering applied to initial signal ((INS) to convert it into input signal (IS), the bandwidth of initial signal ((INS) being wider than the one of input signal (IS)
- the method is followed by a step (EXP) of extraction of parameters (PARAM) from sequences of filtered samples (FS) for each frequency (FN) from the plurality of frequencies (F)
- parameters (PARAM) extracted from sequences of filtered samples (FS) include instantaneous amplitude (IA) of filtered signal (FS)
- parameters (PARAM) extracted from sequences of filtered samples (FS) include instantaneous frequency (IF) of filtered signal (FS)
- parameters (PARAM) extracted from sequences of filtered samples (FS) include instantaneous phase (IP) of filtered signal (FS)
- instantaneous frequency (IF) of a filtered signal (FS) measured on the basis of the difference of successive measures of the instantaneous phase (IP) of filtered signal (FS)
- parameters (PARAM) extracted from sequences of filtered samples (FS) include information necessary to compute real cepstrum (CR) of input signal (IS)
- parameters (PARAM) extracted from sequences of filtered samples (FS) include information necessary to compute complex cepstrum (CC) of input signal (IS)

REFERENCES RELATIVE TO THE INVENTION

In the field of signal processing and filters that can be used to extract audio information, one can quote the following references:

Reference 1: Richard G. Lyons "Understanding Digital Signal Processing" Second edition, 2004, Prentice Hall editor, Reference 2: Chapter 6 (Nawab, Quatieri "Short Term Fourier Transform") of the book "Advanced topics in Signal Processing" ("Edited by Lim, Oppenheim", Prentice Hall editor, 1988)

Reference 3: Chapter 8 ("Communication Systems") of the book "Signal and Systems", Alan V. Oppenheim and Alan S. Wilsky, Second edition, 1997, Prentice Hall editor Reference 4: Kuldik K Paliwal et al "Frequency related representation of speech" Proceedings Eurospeech 2003 (2003-09-01) Pages 65-68 XP007006696

MAIN TECHNICAL ELEMENTS CONCERNING THE INVENTION a) Limitations of Current Methods Traditional time-frequency analysis, such as the spectrogram traditionally associated with the windowed Fourier Transform (or Short-Time Fourier Transform), frequently encounter a well known limitation, sometimes called "uncertainty principle": the higher the frequency accuracy, the more time required to obtain this information.

Standard Fourier Transform, indeed, introduce limitations that imply that it is not possible to have simultaneously a good accuracy in time and a good accuracy in frequency. For example, with a time window of 3 to 4 milliseconds long, frequency resolution is at best 300 Hz or 250 Hz respectively. One also notices that time frequency views (generally called "spectrograms") lack of clarity and accuracy.

This limitation can be removed by the technique called "reassignment" with which one notices to increase in very noticeable way clarity and accuracy of spectrograms. These computations are however quite heavy, and in particular require floating point computations in order compute ratios used in reassignment.

Other techniques are possible, and in particular use of wavelets ("wavelets"). In practice however, it is necessary to use working frequencies much higher than the one of the analyzed signal.

b) Preferred Computing Platforms for the Invention

The present invention aims in particular to allow implementing on computing platforms (CP) particularly economical signal processing operations which required until now not very economical computing platforms.

Computing platforms concerned by the present invention are the following:

a) Low or medium end microcontrollers (high end 8 bits, low and medium end 16 bits)

b) Programmable logic components (or FPGA), in particular but not exclusively low cost FPGAs, which operate with clock frequencies on the order of 100 MHz c) Dedicated integrated circuits (ASIC)

One can notice that these computing platforms allow implementing embedded and autonomous systems, for example powered by electrical batteries or rechargeable batteries.

Moreover, these platforms have very high operating frequencies (clock frequencies of several tenths of MHz, or more), but they are not in standard provided with floating point computation facilities. It is always possible to perform floating point computations on these platforms, but this type of computation is very resource-consuming (in time and integrated circuit area).

As a consequence, the solution usually used is to perform fixed-point computations. However, in most situations, the consequence is a significant loss of accuracy.

On the opposite, the invention uses specific techniques that allow getting free from most of the constraints relative to fixed-point computations.

The previous platforms list is indicative and other types of computing platforms can be used.

c) Main Types of Signals as Regards the Invention

The invention allows in particular to process in a particularly advantageous way signals which have a useful frequency which is at least an order of magnitude lower than the computing platforms operating frequency.

These signals include therefore audio signals (which are sampled, depending on the application, at frequencies that typically vary from 8 KHz (telephony) to 96 KHz (professional hi-fi).

Signals of all types, for example originating from medical sensors (treatments for the body in particular) or industrial sensors, the frequency of which is comparable to or lower than audio signals frequency can also be advantageously processed by the invention.

The previous list of signal types is indicative and other types of signals can be processed by the invention.

e) Remark on Time-Frequency Analysis

An important point highlighted in the reassignment method is the following: accuracy of localization of a signal in the time-frequency plane can be as good as required if, in a given area of the time-frequency plane, there exists only one frequency component of the signal in that domain. But if there exists more than one frequency component in a given domain, limitations resulting from the uncertainty principle then apply. It is therefore necessary to distinguish on one hand accuracy with which it is possible to localize a point in the time-frequency plane, and in the other hand possibilities to separate two points close to each other in that time-frequency plane.

This remark is to be paralleled to the following remark according to which the notion of instantaneous frequency a signal has meaning only if this signal comprises only one frequency component, and if not its value can fluctuate in time very significantly even if the concerned frequency components have a constant frequency in time.

PRESENTATION OF FIGURES

Other characteristics and advantages of the invention will appear during the following description, given as a non limitative example, in reference to attached figures in which.

FIGS. 3, 4, 5, 6 contain views of the whole invention in the form of block diagram.

FIGS. 7, 8, 11, 12, 13, 14 and 15 represent temporal representations of signal processed within the framework of the method that is the object of the invention.

Figure 9:
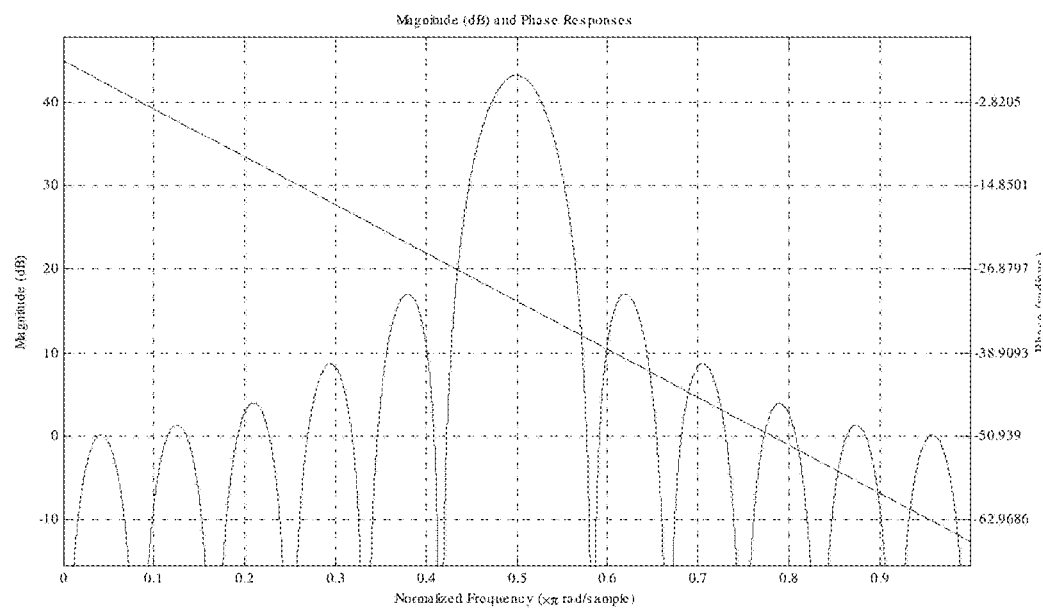
Figure 10:
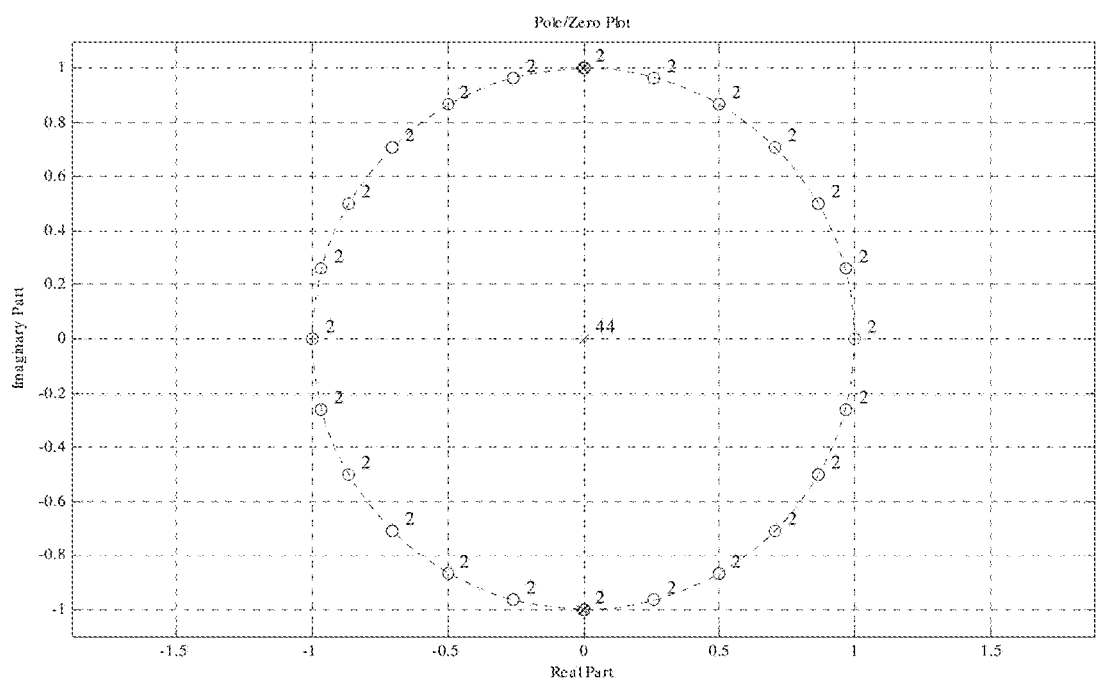
Figure 16:
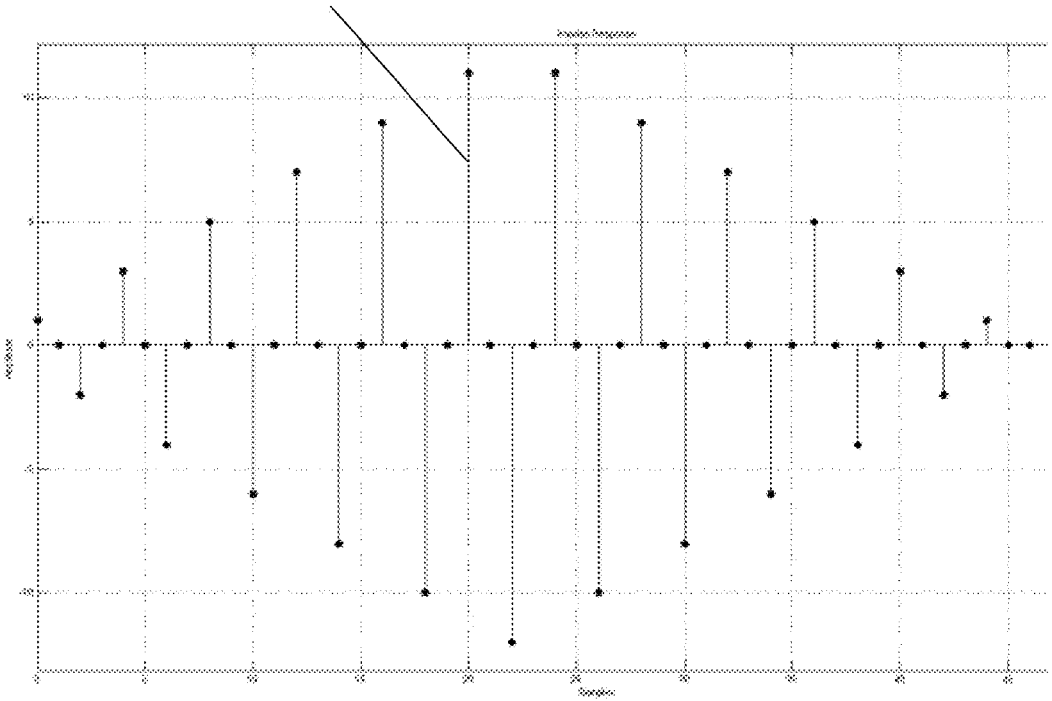

FIGS. 9, 10 and 16 describe characteristics of a frequency selective filter that can be advantageously used within the framework of the invention.

Figure 17:
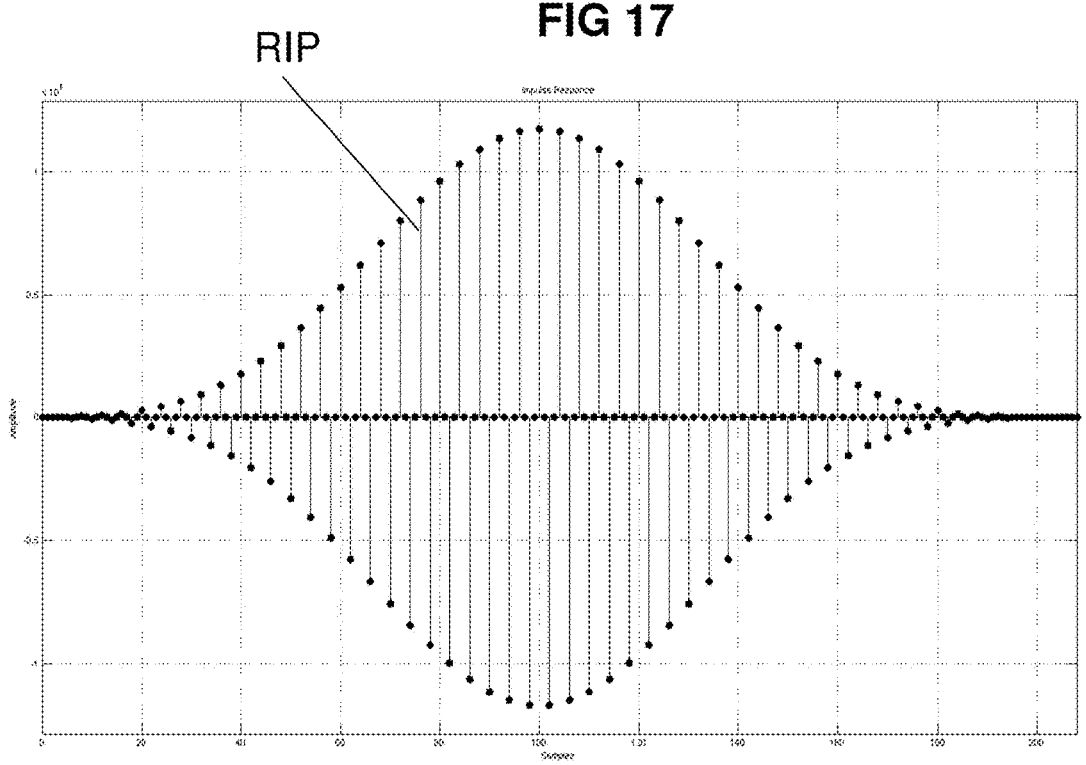

FIG. 17 shows the impulse response of another frequency selective that can be advantageously used within the framework of the invention.

Figure 18:
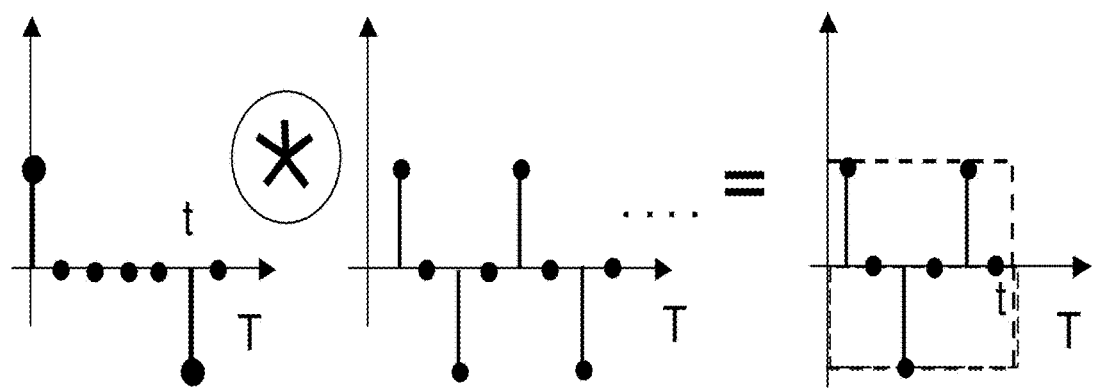
Figure 19:
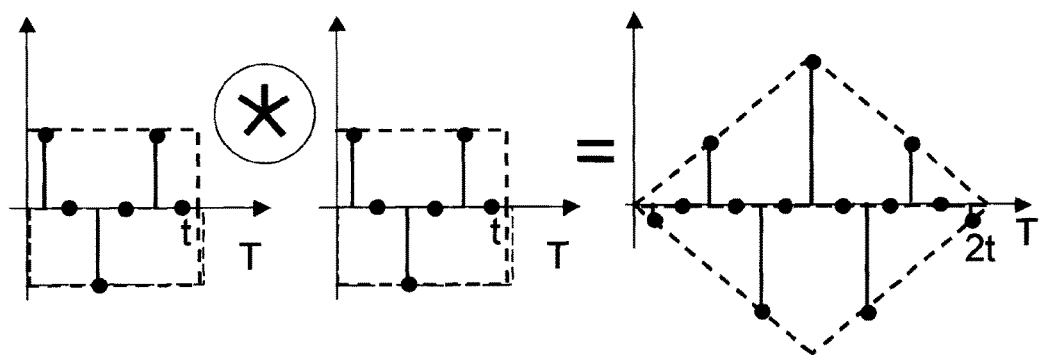
Figure 20:
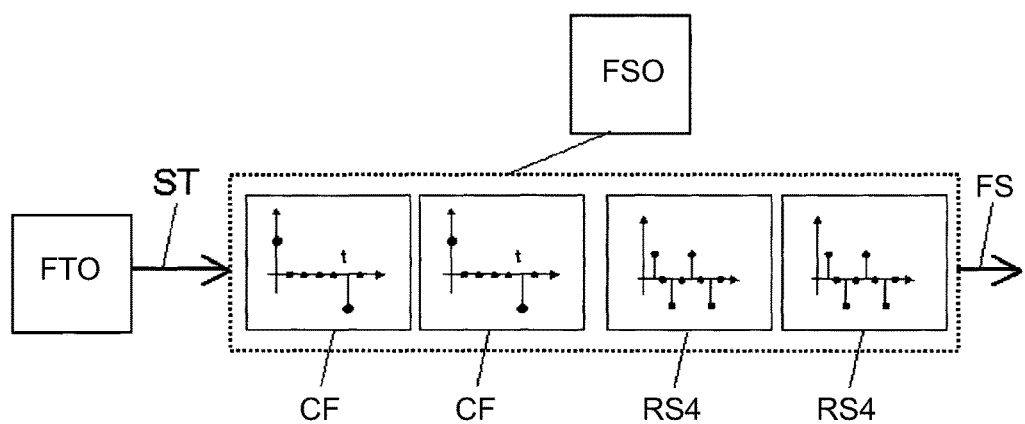

FIGS. 18 and 19 explain the shape observed on FIG. 16.

FIGS. 20, 21, 22 and 23 describe possible architectures to implement frequency selective actions.

Figure 25:
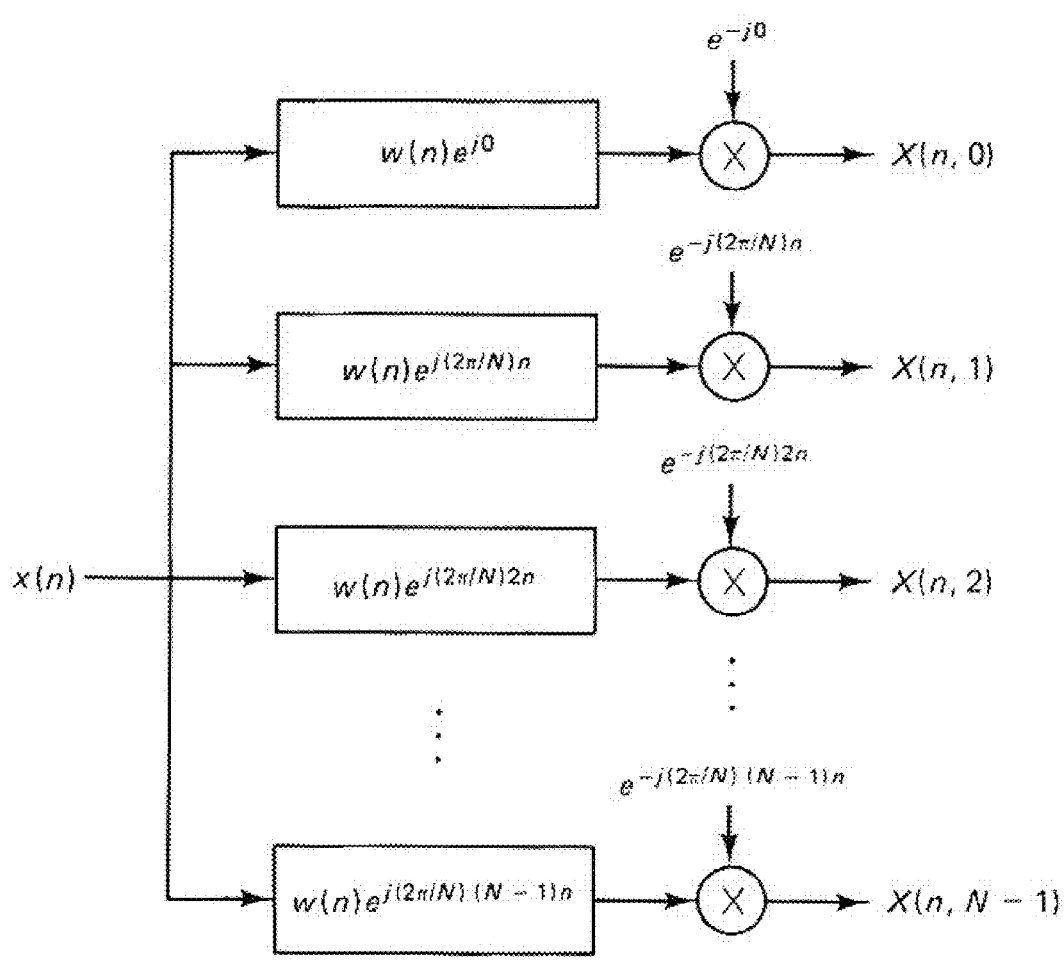
Figure 26:
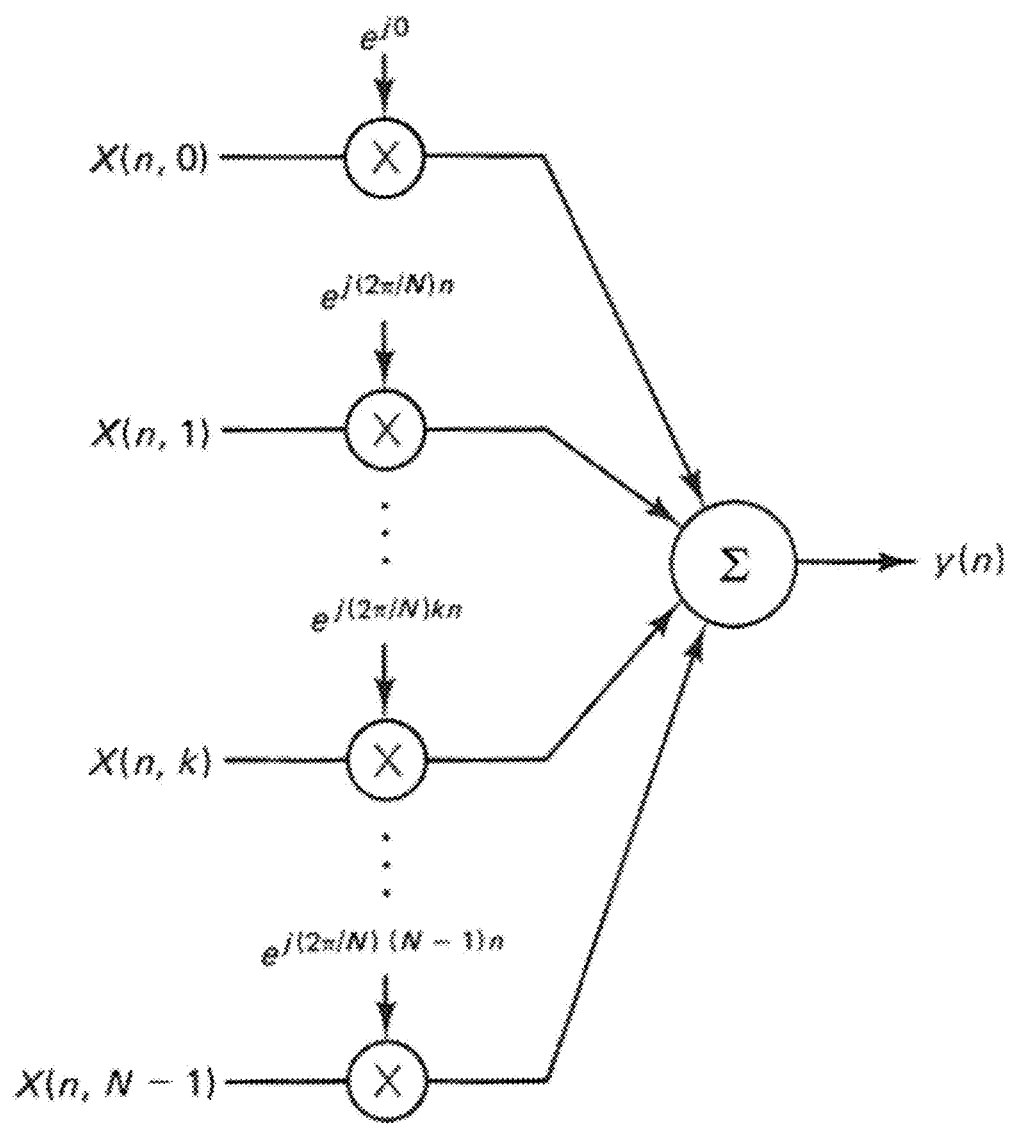

FIGS. 24, 25 and 26 come from Reference 2 and describe elements concerning the TFG that are related with the invention.

FIG. 27 compares the computation of a Sliding Fourier Transform with computations performed within the framework of the invention.

FIG. 28 is a table that compares numbers of multiplications and additions to perform a Sliding Fourier Transform according to the invention and according to a traditional method.

DETAILED DESCRIPTION OF THE INVENTION

On the different figures, the same references are used to designate identical or similar elements.

1) Global View of the Invention

The method according to the invention has the objective of implementing an analysis with a filter bank operating with a plurality (N) of frequency selective filters (FS), with distinct center frequencies (FN), operating on samples of a real input signal (IS), sampled at a sampling frequency (SF), providing instantaneous frequency and amplitude information as well as information allowing to perform simultaneously a Sliding Fourier Transform.

This method comprises in particular the 4 following steps:

a) Preprocessing operations in order to transform samples of the input signal (IS) into a sample sequence (SS)

b) A plurality (N) of frequency translation operations (FTE), each one corresponding to one of the analyzed frequencies (FN) from the plurality (N) of frequencies, each one being adapted to change this frequency (FN) into the frequency (F4), equal to a quarter of the sampling frequency (SF), and providing a plurality (N) of signals (ST) translated in frequency to the frequency (F4) based on the sample sequence (SS)

c) A plurality (N) of frequency selective filtering operations (FSO), operating on each of the signals (ST) translated in frequency from the plurality (N) of these signals, and performed each at the frequency (F4) and providing a plurality (N) of filtered signals (FS), each of these filtered signals (FS) having a frequency bandwidth (BF) centered on the frequency (F4)

d) A plurality (N) of extraction operations (EXP) of parameters (PARAM) on the basis of the plurality of filtered signals (FS), including for each of the filtered signals (FS) the estimation of at least one of the parameters among:
Instantaneous phase (IP)
Instantaneous amplitude (IA)
Instantaneous frequency (IF)
Sliding Fourier Transform (STFT)
and step a) can comprise a frequency selective filtering and/or an up sampling adapted limit the maximum frequency (FB) of the input signal (IS) to a maximum frequency (FB) less than said frequency (F4), and also Sliding Fourier Transform (STFT) is implemented by means of the following additional step:

e) A plurality (N) of frequency translation operations (TF0), operating on the plurality (N) of real filtered signals (FS) having a frequency bandwidth (BF) centered on the frequency (F4), each one being adapted to translate frequency (F4) into zero frequency Technical aspects corresponding to these steps are described in the following parts of the present section describing in detail the invention:

Parts 2) and 3) Steps a), b) and c)
Parts 4, 6, 8 Step b)
Parts 5, 7 Step a)
Parts 9, 10, 10bis, 11: Step c)
Parts 12, 13, 14 Step d)
Parts 15, 16 All steps The method according to the invention can also have as objective the implementation of a plurality (N) of frequency selective filters (FS) operating in parallel on this same plurality (N) of distinct frequencies (FN), followed by an extraction of the parameters of the output signals of each of these filters. This method comprises the 4 following steps:

1) Memorization at the input of the digitized signal
2) Analysis of the input signal, operating on a sequence of samples of the signal and providing for each sequence of samples of signal and each analyzed frequency a signal that is translated in frequency and filtered
3) Release of memory used for a sequence of samples when all the analysis related to this samples have been performed
4) Parameter extraction from the signal translated in frequency and filtered The components of these 4 steps will be successively described, as well as actions that may precede these 4 steps.

2) Memorization at the Input of the Digitized Signal and Release of Memory

The method according to the invention processes in input samples of a digitized signal (IS), sampled at a sampling frequency (SF).

These samples are subject to an input memorization operation (IMO), continuously memorizing samples of a digitized signal (IS), into a digital memory (MN). This digital memory (MN) will later be the subject of read operations (RD), as many times as requested in order to process the plurality (N) of distinct frequencies (FN) analyzed. Multiple reads of a digital memory (MN) are not a problem when the clock frequency of the memory is significantly higher than the sampling frequency of the digitized signals.

Memory that is used can be a memory that that internal to the computing platform or external (for example for a FPGA: internal memory or external RAM memory component).

When all the required read operations (RD) are performed, a release operation (RLO) of the memory resource attributed during input memorization operation (IMO) to the sequence (SS) of samples of input signal (IS), the length of which is (NM), will be performed during a release operation (RLO).

3) Analysis Operation (ANA)

Analysis operation (ANA) concerns each of the analyzed frequencies (FN), and comprises the following steps:
b1) Read of a sample sequence (SS) (examined previously)
b2) frequency translation (FTE) (examined later)
b3) frequency selective filtering (FSO) (examined later)

Figure 1:
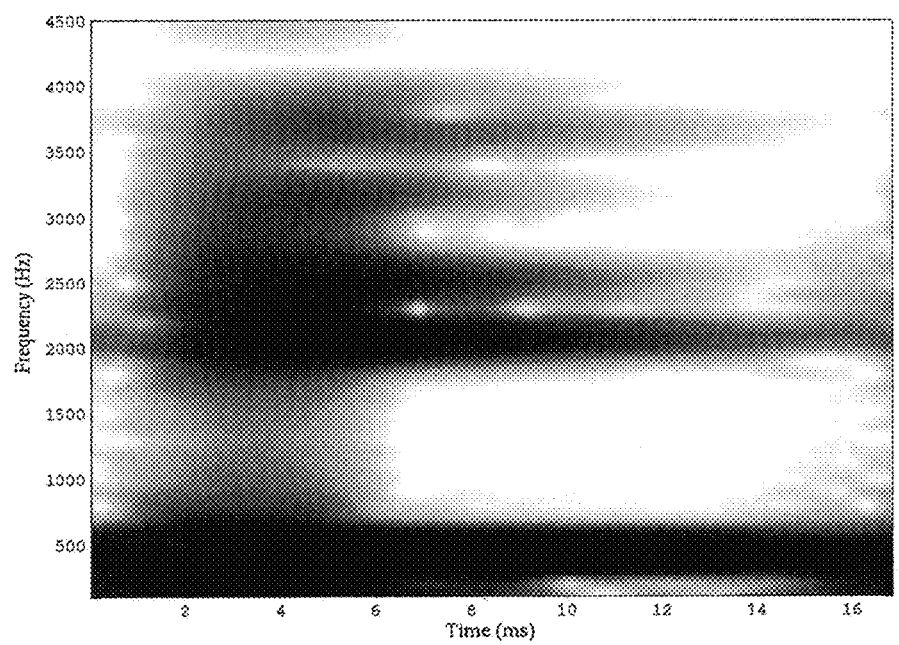
FIG. 1 shows an example of audio signal spectrogram generated by a standard Fourier Transform, before reassignment operation.
Figure 2:
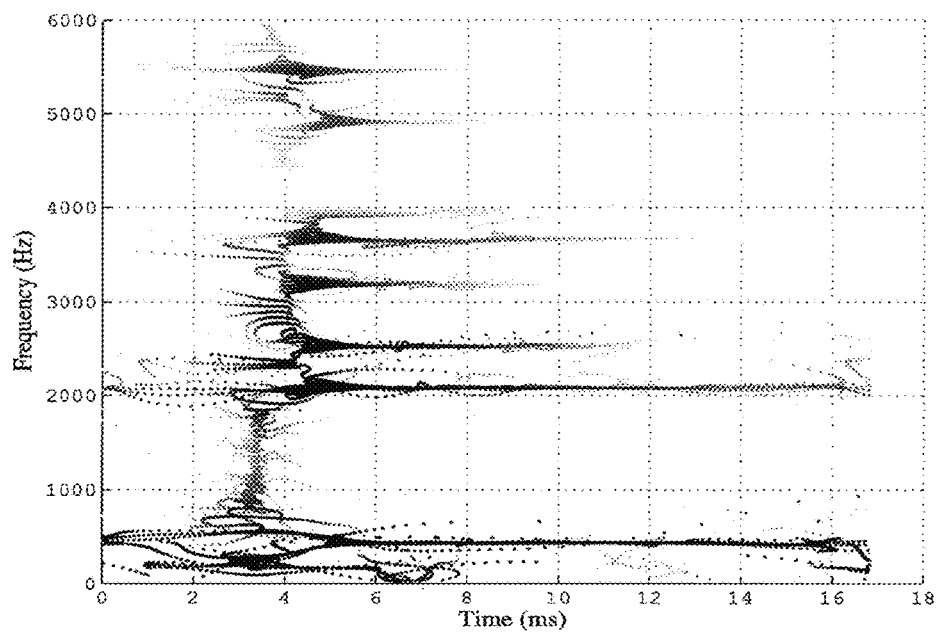
FIG. 2 shows the same audio signal spectrogram generated by a standard Fourier Transform, after reassignment operation.
Figure 3:
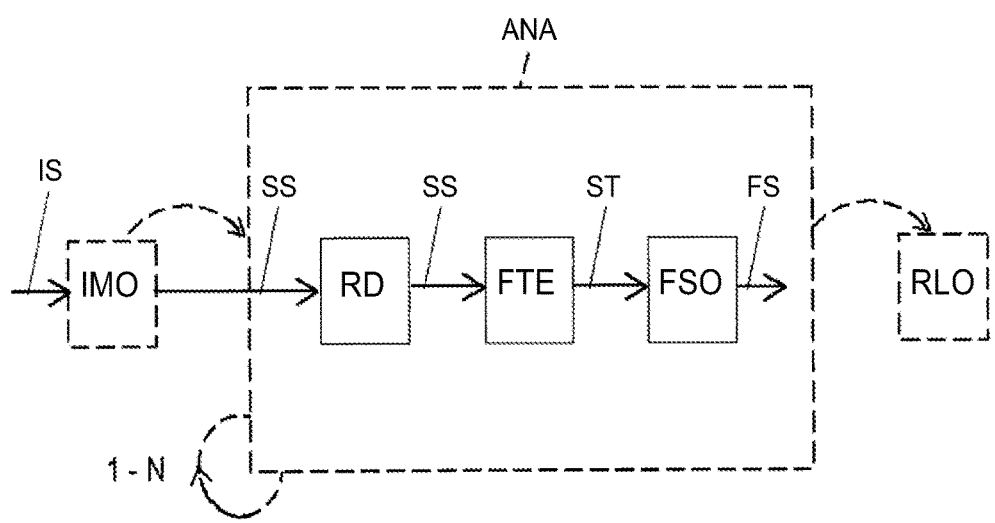

FIG. 3 is a global view under the form of a flowchart of the method composed of the steps (IMO), (ANA) and (RLO), which show these steps as well as the various intervening signals.

Figure 4:
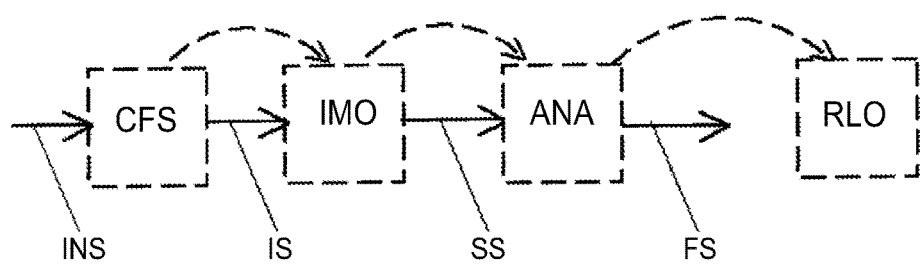
Figure 5:
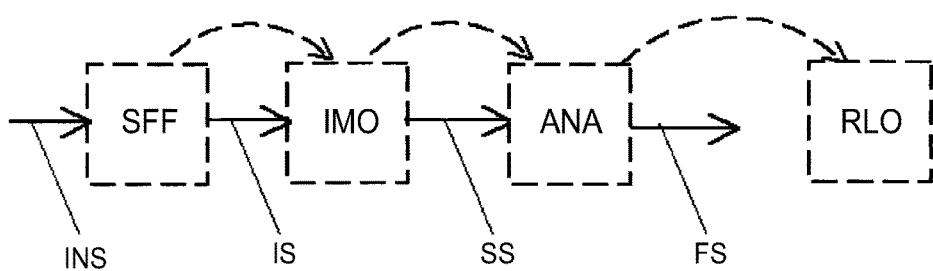

FIG. 4 is a summary view under the form of a flowchart of the method of FIG. 3, preceded by a frequency translation operation (CFS), that will be described later. FIG. 5 is a summary view under the form of a flowchart of the method of FIG. 3, preceded by a frequency selective filtering operation (SFF), that will be described later.

Figure 6:
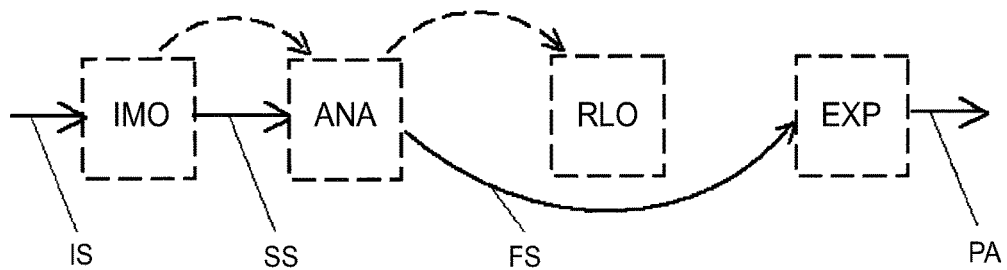

FIG. 6 is a summary view under the form of a flowchart of the method of FIG. 3, followed by an extraction operation (EXP) of signal parameters, that will be described later.

4) Frequency Translation (FTE)

For each of the frequencies (FN) of the plurality (N) of frequencies, the samples of the signal memorized (SS) in the digital memory (MN) are the subject of a frequency translation action (FTE) implemented by the classical multiplication operation by a digital signal, preferably sinusoidal, with an adapted frequency, generated by a local oscillator (OL), generating a sequence of frequency translated signals (ST) based on the input signal (IS). Reference 3 details the main methods that can be used to implement frequency translation operations (within the context of operations called "amplitude modulation") using real sinusoidal waves or by means of complex exponentials. FIG. 24 (part (A) of which is FIG. 6.7 and part (B) of which is FIG. 6.16 of Reference 2) describes in its part (B) the implementation with real operations (sinuses and co sinuses) of a frequency translation operating on a complex number by multiplication with a complex exponential, represented in part (A).

One notices an inaccuracy concerning—signs in part (B), because the complex numbers is not verified: $(a+ib) \times (c+id) = (ac-bd) + i(ad+bc)$.

It might be advantageous, and analogous to the frequencies used in Fourier Transforms, to use as frequencies (FN) of the plurality (N) of frequencies the normalized frequencies (fn) equal to $(2 \times PI \times (n/N))$, n being able to vary from 0 to N−1, corresponding to frequencies in en Hertz varying from 0 to $((N-1)/N) \times (SF))$, (SF) being the signal sampling frequency, and (IP) the well-known number approximately equal to 3.14159265.

Translation by a Real Signal/Complex Signal

There are two main methods to perform this frequency translation. Indeed, frequency translation can be classically performed by a multiplication:

M1) Real (only one multiplication for each sample of the real input signal)
M2) Complex (two multiplications by two signals in quadrature for each sample of the real input signal)

Complex frequency translation (with two signals in quadrature) is more accurate (no image frequency), but requires however a higher computing load for the frequency translation and for later signal filtering.

Real frequency translation requires less computation, but may generate image frequencies (two initial frequencies ending into the same translated frequency).

Objective of the Frequency Translation Action (FTE)

The objective of the frequency translation action (FTE) is to translate the signal in frequency so as to carry it to the frequency (F4), equal to a quarter of the signal sampling frequency, whatever may be the analyzed frequency (FN). Action (FTE) processes in input for each analyzed frequency (FN), a sequence (IS) of the input signal and generates a sequence of frequency translated samples (ST) around the frequency (F4), of the same length (NM). The frequency (F4) is in principle equal to a quarter of the sampling frequency (SF). In practice, this frequency (F4) might be substantially equal to this theoretical value inasmuch as observed consequences with this theoretical value can also be used in the context of the application into which the method according to the invention is used.

As it will be seen later, translation to the frequency (F4) brings particular advantages both concerning the frequency selective filtering operation and the wealth of parameters that it is possible to extract from the input signal after frequency translation and filtering.

Method for Implementing the Frequency Translation Action (FTE)

As it was seen previously, the frequency translation operation can be implemented using real or complex signals. The following computations will allow showing the differences resulting from the use of real or complex signals.

In the rest of the document, the following notations will be used:

a) exp< > to designate an exponential (example: exp<i×(IP)>=−1=exponential of i×PI)

b) a frequency (F), sampled with a sampling frequency (SF) and a sampling rate TE (time between two samples, which is the inverse of the sampling frequency), expressed in Hertz is represented by one of the two following numerical sequences, indexed by index N:

Real sinusoid: cos(2×PI×F×TE×N)

Complex exponential exp<2×PI×F×TE×N> depending on whether one refers to a real signal (sinusoid) or to a complex signal (complex exponential)

One also knows that there is the equality:

cos(2×PI×F×TE×N)=(½)×(exp<2×PI×F×TE×N>+
  exp<2×PI×(−F)×TE×N>))

(a real wave of frequency (F) defined by a cosinus is half of the sum of a complex exponential at frequency (F) and a complex exponential at frequency (−F))

With these notations, frequency translations correspond to the following equations:

a) Real signal (sinusoid with frequency (SF)) being frequency translated by a multiplication with another real signal (sinusoid with frequency (FN)):

cos(2×PI×FE×TE×N)×cos(2×PI×FN×TE×N)=(½)×
  (exp<2×PI×FE×TE×N>+exp<2×PI×(−FE)×TE×
  N>))×(½)×(exp<2×PI×FN×TE×N>+exp<2×PI×
  (−FN)×TE×N>))=(¼)×(exp<2×PI×(FE+FN)×
  TE×N>+exp<2×PI×(−FE+−FN)×TE×N>+
  exp<2×PI×(FE−FN)×TE×N>+exp<2×PI×(−FE+
  FN)×TE×N>)=(½)×(cos(2×PI×(FE+FN)×TE×
  N)+cos(2×PI×(FE−FN)×TE×N))

One finds again the well-known result according to which mixing by multiplication of two real frequencies generates a real signal containing the sum and the difference of frequencies.

b) Signal (sinusoid with frequency (SF)) being frequency translated by a multiplication with a complex signal (complex exponential with frequency (+FN)):

cos(2×PI×FE×TE×N)×exp<2×PI×FN×TE×N>=(½)×
  (exp<2×PI×FE×TE×N>+exp<2×PI×(−FE)×TE×
  N>))×(exp<2×PI×FN×TE×N>=(½)×(exp<2×PI×
  (FE+FN)×TE×N>+exp<2×PI×(−FE+FN)×TE×
  N>))

The mixing by multiplication of a real sinusoid and a complex exponential is a complex signal, equal to the sum of two complex exponentials, one with the sum frequency and the other with the difference frequency.

Consequences for the Position of the Frequency (F4) Relative to the Pass Band of the Input Signal Input signal (IS) pass band is contained between a minimum frequency (FA) and a maximum frequency (FB), and all frequency translation operations and subsequent actions will be relative to frequencies contained between those two frequencies.

With real signal, the previous computation shows that the frequency (F4) cannot be located inside the pass band, because then two frequencies of the signal pass band may be, by multiplication with a real sinusoid, translated to the frequency (F4). This problem will not occur if (F4) is outside the pass band of the input signal (IS), for example located at a frequency higher than the frequencies of the input signal (IS) pass band. It will be seen later that a simple method to locate the frequency (F4) outside the pass band of the input signal (IS) is to oversample by a factor 2 the input signal (IS).

With complex signals, in contrast, there is no image frequency and the frequency (F4) can be located inside the pass band of the input signal (IS).

Note: The preceding remark agrees with the general remark according to which a complex signal (which contains two real values for each sample) contains, in the principle, as much information as a real signal which is sampled twice as frequently.

In the following of the document, unless otherwise mentioned, frequency translation operations on analyzed signals will be implemented by multiplication with a real signal.

Possibility of Swapping Frequency Translation Action (FTE) and Filtering Actions One Notices the Following Elements:

a) filtering operations that are being considered are linear frequency filtering operations with coefficients that are constant during an analysis period; these filtering operations are thus linear and time invariant operations (linear and time invariant (LTI))

b) a frequency translation operation by a constant frequency (multiplication by a complex exponential or the sum of two complex exponentials for a multiplication by a sinusoid) are also linear and time invariant operations It is a known fact that it is possible to swap two or more operations that are linear and time invariant. It is therefore possible within the framework of the invention to swap filtering operations and frequency translation operations. It is also possible to replace a multiplication by a complex exponential by a sequence of two multiplications by complex exponentials if the product of the complex exponentials is equal to the initial complex exponential à.

5) A Preliminary Up Sampling

In order to be able to use a frequency translation performed by a real signal within the framework of the invention, with signals sampled at a sampling frequency (SF), it appears that it is advantageous to consider only signals with a frequency lower than (F4), (F4) being the frequency equal to a quarter of the sampling frequency, and not signals with a frequency lower than (F2), (F2) being the frequency equal to a half of the sampling frequency and which is classically the maximum frequency contained in the sampled signal. This context will indeed allow suppressing within the framework of the invention the possibility of image frequencies.

A simple and advantageous method that allows to consider signals with a frequency lower to (F4), is to oversample by a factor 2 initial signal ((INS) so as to create input signal (IS). An alternative method is to perform a frequency selective filtering operation so as to keep only frequencies lower than (F4) or lower than a frequency lower than (F4) in the input signal.

For example, for a classical telephony signal (pass band from 300 Hz to 3.400 Hz with a signal sampled 8000 times by second), all or part of the frequency spectrum might be resampled in a classical way 16000 times by second. Such an resampling, indeed, will have as consequence that the 4000 Hz frequency, which was initially the maximum frequency possible for the signal because it was equal to half of the sampling frequency becomes, after the resampling, the frequency (F4), equal to a quarter of the new sampling frequency. After the sampling frequency doubling from 8000 to 16000 Hz, the frequency translation is done towards the high end of the frequency range and as a consequence only one frequency of the analyzed frequency band will be translated to the frequency (F4).

6) An Example of Frequency Translated Signal

Within the context defined previously, if analyzed frequency (FN) is frequency (IF), frequency (FO) of local oscillator (OL) can be (F4)–(IF).

Note: In all figures concerning signals and parameters extracted from these signals:
Horizontal axis represents time; signals are sampled at 8000 Hz, which means that an interval of length 100 on the horizontal axis represents 100 times 1/8000th of a second, which is 12.5 milliseconds, and an interval of length 50 represents 6.25 milliseconds
Vertical axis represents a value, which is either an amplitude or an angle expressed in degrees
FIG. 7 presents time domain variation of an input signal (IS) modulated both in frequency and in amplitude, sampled at a frequency of 8000 Hz (50 units on horizontal axis represent 6.25 milliseconds):
a) frequency is centered around 597 Hz and varies continuously and linearly ("chirp") from around (597−45) Hz to (597+45) Hz; initial phase is set to −30 degrees
b) this frequency modulated signal is also amplitude modulated at a 153 Hz frequency with a modulation index equal to 0.75
FIG. 8 presents signal (IS) from FIG. 7 modulated both in frequency and amplitude transformed into a signal (ST) after frequency translation towards the frequency (F4).

7) Possible Preliminary Actions (CFS) and (SFF)

For some frequencies of the analyzed signal, it might be in contrast advantageous to downsample or not to upsample the signal. For example, the initial sampling at 8000 times per second corresponds to a frequency (F4) of 2000 Hz. A frequency selective operation operating on an initial signal ((INS) in order to generate input signal (IS) before the memorization operation can for example separate the signal to be analyzed into two frequency bands, one extending from 0 Hz to a cut off frequency of 2000 Hz or a little less, the other extending from this cut off frequency to maximum signal frequency, that is 4000 Hz.

This preliminary frequency selective filtering action (SFF) operating on an initial signal ((INS) so as to create an input signal (IS) can be repeated and some parts of the frequency spectrum can be downsampled so as to reduce the number of computing operations that will be required in subsequent steps. For example the part of the spectrum extending from 0 to 500 Hz can be analyzed with a sampling frequency equal to 2000 Hz, which is the quarter of the initial sampling frequency.

The down or upsampling actions of an initial signal ((INS) that are possible in order to create an input signal (IS) will be grouped under the name of change of sampling frequency (CFS). It is possible to combine several changes of sampling frequency (CFS) and/or de preliminary frequency selective filtering (SFF) actions operating on an initial signal ((INS) in order to create the input signal (IS).

These frequency selective filtering and up or down sampling actions are classical actions for which there exists many efficient techniques in terms of required number of computing operations. Besides, signal frequency ranges and sampling frequencies indicated above are relative to an important domain, which is the vocal signal transmitted by telephony. This usage case was given as an example, and values related to other cases, for example a high fidelity audio signal sampled at 44.1 KHz can be deduced in a classical way. In all cases, frequencies analyzed during subsequent operations will be included in the frequency band of the analyzed signal.

8) Local Oscillator Multiplexing Management

In the functioning of the invention, which is multiplexed in time since there are several frequencies to be processed in parallel, local oscillator (OL) must frequently change its frequency and, when it comes back again to an analyzed frequency, it must find a context that allows it to generate signal samples that are the exact following of the last samples that were generated for this same frequency. This local oscillator must therefore be agile (that is able to change rapidly) both in phase and in frequency.

The implementation of such an agile local oscillator can be done digitally with economical means by using the Direct Digital Synthesis (DDS) technique, which mainly requires adding and table look-up operations, and no multiplication.

Context management, which means values of local oscillator (OL) work variables and other elements that perform specific computations for each analyzed frequency (FN), can be classically implemented by memorizing or keeping in memory these work variables at each change of analyzed frequency, and referring to them again when frequency (FN) is again analyzed.

9) The Frequency Selective Filtering Action (FSO)

For each analyzed frequency (FN), the sequence of frequency translated samples (ST) around the frequency (F4) generated the frequency translation action (FTE) is then subject to a frequency selective filtering action (FSO) applied to sequence (ST), in order to eliminate frequencies that are distant from the frequency (F4), generating a sequence of filtered samples (FS), of the same length.

The frequency selective filtering action (FSO) has the objective of keeping only, for each sequence (ST) of translated frequency samples around the frequency (F4) (there is such a sequence for each analyzed frequency (FN)), frequencies close to the frequency (F4), within a pass band (BF), and this pass band (BF) may depend on the analyzed frequency (FN).

Indeed, an analysis of instantaneous amplitude and frequency of a signal can only be relevant if it concerns a single frequency component, and the frequency selective filtering action (FSO) has the purpose of ensuring as much as possible that the plurality (N) of filtered signals (FS) are in accordance with this condition. Pass bands (BF) are adapted so that each pass band (BF) contains essentially only one frequency component of the input signal (IS).

There exist many publications defining such frequency bands for a vocal signal. For a vocal signal in telephony, one may consider as a first approach that these frequency bands are more or less plus and minus 50 or 100 Hertz for each analyzed frequency (FN), the relevant frequency band becoming wider when the central frequency increases. Other frequency bands, with for example a width extending from plus or minus 5 Hz to plus or minus 200 Hz can be considered if analyzed frequency spectrum is widened so as to go higher or lower. A 100 or 200 Hz (plus or minus 50 or 100 Hz) pass band compared to a 8000 or 16000 Hz sampling frequency does not raise any question on principle regarding its implementation, whatever the definition of this pass band may be (at −3 dB or −6 dB for example).

10) An Example of an Advantageous Selective Filter Constraints for the Choice of a Filter for the Invention Constraints for selecting the filter are of various types:
a) Best possible accuracy, with a fixed point implementation
b) Predictable delay as a function of frequency (for a given sequence of samples at the output of the selective filter, one wants to know with the best possible accuracy what is the sequence of samples at the input that corresponds to sequence of samples at the output)
c) Ability to chose the filter pass band
An Advantageous Type of Filter
In an advantageous way, there exists one filter type that has the following characteristics within the context of filtering around the frequency (F4):
a) 100% accurate computations
b) Linear phase filter, which means it has a constant group delay (which means the response delay of the filter as a function of frequency)
c) Ability to choose the desired pass band
Such a filter is a frequency sampling filter (FSF) (Reference 1 describes in detail this type of filter), and is composed of 2 cascaded elements:
1) A comb filter, composed of an adder and a delay line; this filter has only des zeroes and no pole
2) A filter with one pole (or two conjugated poles) located on the unit circle of the complex plane (with only one pole the filter has complex coefficients, with two conjugated poles, it has real coefficients)
The important point with this type of filter is that the zero(es) must exactly compensate the poles, and the accuracy of this compensation is a very important point for the correct functioning of the filter.
Application of this Type of Filter to Invention
Within the Framework of the Invention:
a) Central frequency of the filter is the frequency (F4), which means that the pole or the poles is or are located on the Y axis (in addition to being located on the unit circle); the coordinates of these poles are thus (0,+1) and (0,−1) (+i and −i in complex notation).
b) As a consequence, compensation between zeroes and pole can be exact and computation of filter response with the pole(s) requires only additions and subtractions, which means that computations can be exact.
c) The length of the delay line determines the pass band of the filter: the more important the length is, the narrower the pass band is
d) In order to obtain more selective filters, it is possible to cascade several filters of the previous type
Use of other types of filters remains however possible.

An Example of this Type of Filter
FIG. 9 shows the frequency response (amplitude and phase) of such a filter, and FIG. 10 shows the poles and zeroes of such a filter.
One notices on FIG. 9 the linear phase response, which implies a group delay (response time of the filter as a function of signal frequency), which is equal to 22 samples.
One notices on FIG. 10:
the numerous zeroes on the unit circle (indicated by o) due to the comb filter of length 24
the 2 poles at (0,+1) and (0,−1) (indicated by x)
the exact superposition of poles with corresponding zeroes
the number 2 written in regard of each pole or zero, which means that it is a filter of order 2
Analysis of the Impulse Response of the Used Filter
FIG. 16 shows the impulse response of this filter, which can be analyzed (with a possible time shift of one sample), as the product of the two following time domain signals:
i) an envelope the shape of which is an isosceles triangle
ii) the following particular numerical sequence: 1, 0, −1, 0, 1, 0, −1, 0, 1, 0, −1, . . . which corresponds to sampling a sinusoid of frequency F4 (see section 13.1.2 "Frequency translation by −fs/4" of Reference 1)
FIG. 17 shows the impulse response of another filter that can be used within the framework of the invention. One notices that, as on FIG. 16, the existence of a sequence of positive, null, negative, null, . . . values, with however an envelope that has a different shape.
The Architecture of the Used Filter and the Impulse Response Generation
FIG. 20 describes the architecture of this filter used to implement the frequency selective filtering step (FSO), as a cascade of four elements:
i) A cascade of two comb filters (CF)
ii) A cascade of two resonators (RS4) tuned to the frequency (F4)
One notices that with this architecture the comb filters (CF) and the resonators (RS4) operate on the plurality (N) of translated signals.
FIGS. 18 and 19 describe in a symbolic manner the generation of the impulse response shown in FIG. 16 on the basis of impulse responses of comb filters (PS) and of resonators:
i) Symbol * indicates that it is a convolution product (in time domain) of two impulse responses, which corresponds to the fact that these impulse responses are relative to elements that are cascaded
ii) FIG. 18 (see FIGS. 7-4-a and 7-7-a of Reference 1) shows that the convolution product of the impulse response of a comb filter (CF), composed by two impulses of opposite signs and separated by a delay which is the order of the comb filter (CF), and of the infinite sequence 1, 0, −1, 0, 1, 0, −1, 0, 1, 0, −1, . . . which is the impulse response of resonator (RS4) generates a finite sequence 1, 0, −1, 0, 1, 0, −1, 0, 1, 0, −1, . . . , which is the impulse response of a "frequency sampling filter" (FEF) composed by a comb filter (CF) and a resonator (RS4) tuned to the frequency (F4)
iii) FIG. 19 (see FIG. 5-45 of Reference 1) shows that cascading two such filters generates an impulse response which is the product of an isosceles triangle of finite width and of an infinite sequence 1, 0, −1, 0, 1, 0, −1, 0, 1, 0, −1, . . . .
FIG. 17 shows the impulse response of another filter that can be implemented with the same architecture, by cascading 4 comb filters (CF) and four resonators (RS4). One notices on this figure that:

the amplitude of the response in the vicinity of the beginning and the end of the impulse response is very close to zero the envelope of the impulse response has a shape very close to that of a Gaussian (it is a known fact that the convolution of 4 rectangles generates a shape that is close to that of a Gaussian)

The Possibility of Other Architectures for this Type of Filter

In the previous description, one notices that both the comb filter (CF) and the resonator (RS4) are linear and time invariant systems, and thus they can be swapped, which means arranged into a priori any sequence. Alternatively, one can also notice that the convolution product is associative and commutative, which leads to the same conclusion.

10Bis) Possible and Advantageous Architectures for Implementing the Frequency Selective Filtering Operation (FSO)

Three Other Architectures for this Type of Filter

Figure 21:
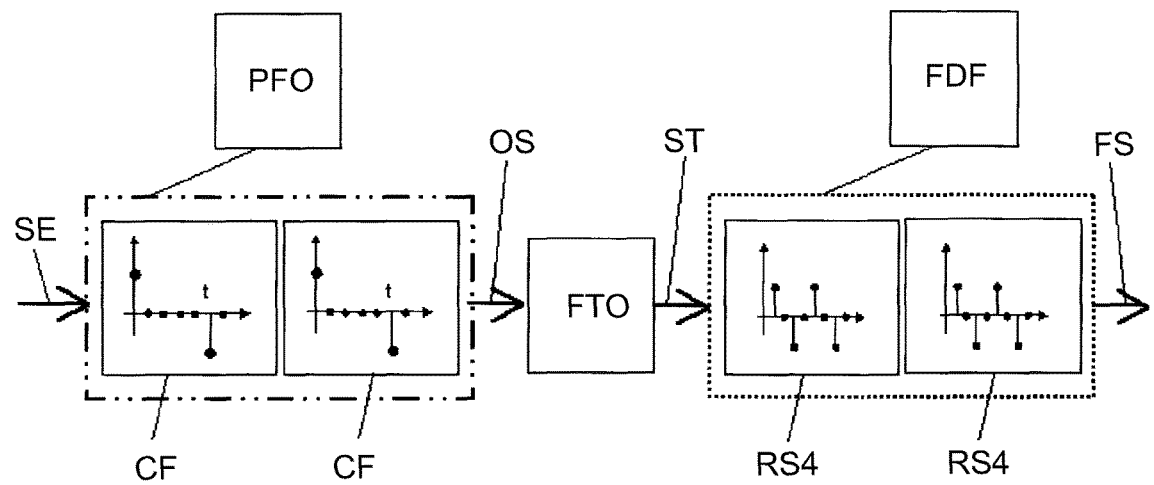
Figure 22:
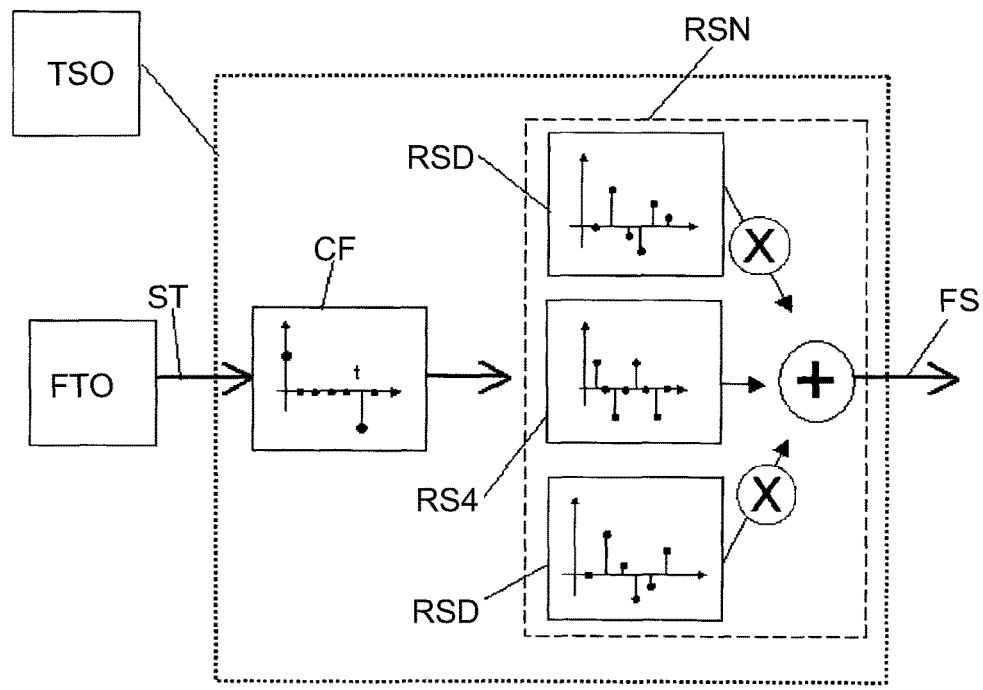

Other architectures are possible and advantageous for the implementation of the frequency selective filtering action (FSO). FIGS. 21, 22 and 23 show architectures in which:

FIG. 21: a single comb filter (CF) or a single cascade (NP) of comb filters (CF) is shared among the plurality (N) of frequency selective filtering operations (FSO)

FIG. 22: a time window that is not rectangular is generated using several resonators with different frequencies working in en parallel and the results of which are multiplied by fixed coefficients and summed FIG. 23: a comb filter (CF) is shared among the plurality (N) of frequency selective filtering operations (FSO) and a non rectangular time window is obtained by using in parallel several resonators with different frequencies (combination of architectures of FIGS. 21 and 22)

First Other Architecture for this Type of Filter

Architecture of FIG. 21 for implementing the frequency selective filtering step (FSO) is the following:

i) A cascade of two comb filters (CF) operating on the input signal (IS) within the context of a prefiltering operation (PFO)

ii) A cascade of two resonators (RS4) tuned on frequency (F4) and acting on the plurality (N) of signals translated in frequency (ST)

iii) A plurality (N) of translation in frequency (FTE) operations located between the previous steps, transforming the input signal (IS) prefiltered by prefiltering operation (PFO) into the plurality (N) of signals translated in frequency (ST)

It is indeed advantageous in terms of resources consumption to be able to share the comb filter (CF) among the plurality of filtered signals (ST).

One notices through both analysis and experimentally that this pooling is possible within the context of the architecture described in FIG. 21, provided that the structure of frequency selective filters (FSF) is respected (number of cascaded comb filters (CF) equal to number of cascaded resonators (RS4)) and that a zero of a comb filter (CF) and the frequency (F4) of the resonator correspond via the frequency translation operation (FTE). The following conditions must thus be respected:

i) For each of the analyzed frequencies (FN), the number (NP) of comb filters of a cascade of (NP) comb filters (CF) is equal to the number (NUM) of resonators of a cascade of (NUM) resonators (RS) tuned to the frequency (F4)

ii) Frequency zeroes of comb filter (CF) comprise each analyzed frequency (FN) of the plurality (N) of frequencies iii) Each frequency translation operation (FTE), corresponding each to one of the analyzed frequencies (FN) of the plurality (N) of frequencies, is adapted to change the frequency zeroes of the comb filter (CF) into the frequency (F4) of the resonators (RS4)

Second Other Architecture for this Type of Filter

The architecture of FIG. 22 in order to implement the frequency selective filtering step (FSO) is the following:

i) A comb filter (CF) operating on one of the translated in frequency signals (ST)

ii) A plurality (RSN) of resonators in parallel ((RS4), (RSD)) tuned on frequency (F4) for resonator (RS4) and on nearby frequencies (FD) for resonators (RSD), the output signals of which are multiplied by fixed coefficients and summed so as to generate as output a filtered signal (FS)

The interesting point of this structure is to be able to improve rejection of nearby frequencies, while keeping a comb filter with a time window that is as short as possible; this performance improvement is obtained at the cost of additional multiplications.

The design of the filters according to this architecture is done according to the design principles of frequency selective filters (FSF) in general, and according to section 7.1.9 of Reference 1 ("Improving performance with transition bands coefficients").

Another interesting point of this structure is to be able to implement with purely frequency domain means time domain windows to be applied to the signals that are processed, as described, for example, in section 13.3 of Reference 1 ("Frequency domain windowing").

Third Other Architecture for this Type of Filter

The architecture of part (A) of FIG. 23 used to implement the frequency selective filtering step (FSO) is based on the architecture of FIG. 22, with the addition of the sharing of the comb filter (CF) described in the architecture corresponding to FIG. 21; it is the following:

i) A comb filter (CF) operating on the input signal (IS) and generating as output a signal (OS)

ii) A plurality of frequency translation operations (FTE), adapted to generate a plurality of frequency translated signals (ST)

iii) For each frequency translated signals (ST), a plurality (RSN) of resonators in parallel ((RS4), (RSD)) tuned on the frequency (F4) for resonator (RS4) and to frequencies (FD) nearby for resonators (RSD), the output signals of which are multiplied by fixed coefficients and summed so as to generate as output a filtered signal (FS)

>>>>> With complex signals, and by analogy with FIG. 27, and particularly part (C), one can notice that it is possible to replace a resonator (RSD), tuned to a frequency (FD), by a resonator (RS4) preceded by a frequency translation operation (FTD), adapted to translate the frequency (F4) to the frequency (FD) of each replaced resonator (RSD) and followed by a frequency translation operation (FTC), adapted to translate the frequency (FD) to the frequency (F4), or possibly to zero frequency in order to implement a Sliding Fourier Transform (STFT); the corresponding architecture is represented in part (B) of FIG. 23 and is the following:

i) And ii): Identical iii) For each frequency translated signal (ST), the plurality (RSN) of resonators in parallel ((RS4), (RSD)) is replaced by:

a resonator (RS4) identical to the one in part (A)

each resonator (RSD) tuned to a frequency (FD) close to (F4) mentioned in part (A) is replaced by a resonator (RS4) preceded by a frequency translation operation (FTD), adapted to translate the frequency (F4) into frequency (FD) of each replaced resonator (RSD) and followed by frequency translation operation (FTC), adapted to translate frequency (FD) into the frequency (F4), or possibly to zero frequency One can notice that when several pluralities (RSN) of resonators in parallel are adapted to operate on several frequency translated signals (ST) corresponding to nearby frequencies (FN), simplifications relative to the architecture described in part 5B) of FIG. 23 can happen, because then some frequency translations (FTD) can turn out to be redundant.

11) An Example of Signal Translated in Frequency and Filtered

Figure 11:
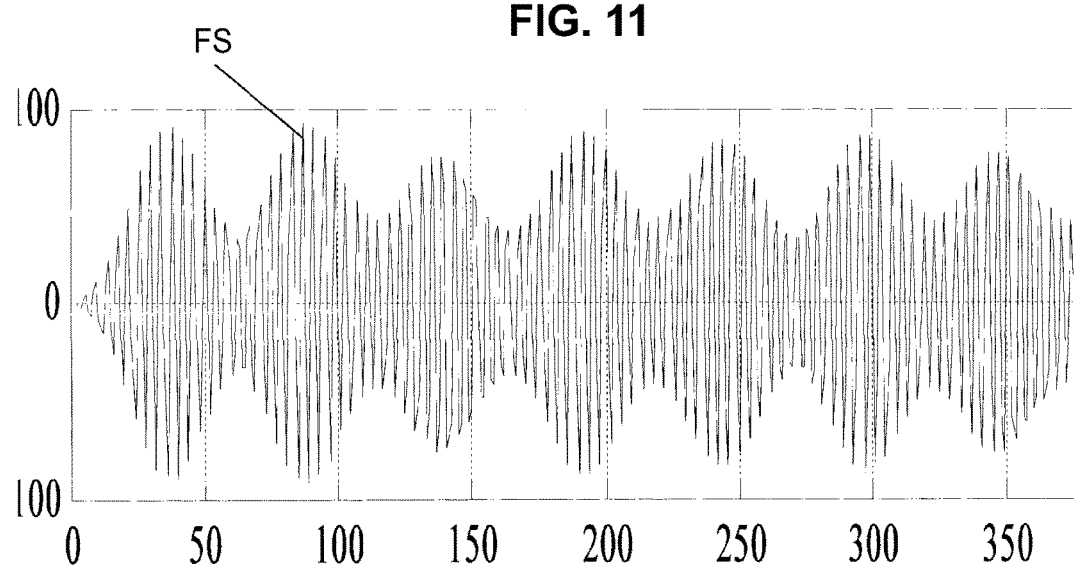

FIG. 11 shows filtered signal (FS) produced based on the signal translated in frequency (ST) of FIG. 8 after passing through the filter described in FIGS. 9 and 10.

One notices the amplitude of the filtered signal (FS) is larger by a ratio of approximately 60 environ to the amplitude of the signal translated in frequency (ST), due to the amplitude gain given by the filter at the considered frequency.

One notices also a start-up period for the filter (which is initialized at zero). This start-up period is close to the group delay of the considered filter, which is 22 samples.

Signal (FS) of FIG. 11 shows the amplitude modulation of the analyzed signal; by contrast frequency information does not appear directly.

12) Extraction of Parameters (EXP)

In the light of using for the frequency selective filtering (FSO) the filter described in FIGS. 9 and 10, or a filter having nearby characteristics. In particular, those are filters with real coefficients. Adjustments are possible for using filters with complex coefficients having similar characteristics.

Extraction (EXP) of parameters (PARAM) of the filtered signal (FS) is based on an important property of the frequency (F4), equal to a quarter of the sampling frequency (SF): successive samples of signal (FS) are shifted by 90°, since there are 4 of them by period of frequency (F4).

Central idea of extraction (EXP) of parameters (PARAM) of filtered signal (FS) is to take advantage of this 90° shift between successive signals, and process signal (FS) as an analytical signal. To this end, analysis will not be based on individual samples of filtered signal (FS), but on pairs of successive samples.

This approach is paradoxical, since it means that a real signal, generated based on a real input signal (IS), after classical signal processing operations implemented only with computations with real coefficients, is processed like a complex signal. This approach is possible following particularly the frequency translation (FTE) to the frequency (F4).

For each pair of successive values of filtered signal samples (FS) (k) and (FS) (k−1), identified by index k, the following computation is performed, which is a classical conversion of a complex number expressed in cartesian coordinates into a complex number expressed as module and argument:

a) Instantaneous Amplitude (IA)=Module(k)=Square Root((FS) (k)*(FS) (k)+(FS) (k−1)*(FS) (k−1))

b) Instantaneous Argument (ARI)=Argument(k)=ArcTangent((FS) (k)/(FS) (k−1))

Which is, for a pair of two successive values:
a) Square Root of the sum of squares
b) Arc tangent of the ratio Besides, in order to verify that the shift between two successive samples is truly 90°, it is advantageous to perform the following computation which allows the computation of a control signal (SC), based on a difference:

c) Difference (D)=(Arc tangent of ratio for k and k−1)−(Arc tangent of ratio for k−1 and k−2)

The result of computation c) should be equal to 90° or −90°. In practice one computes control signal (SC) based on difference (D) in the following way:

d) SC(k)=Absolute value of difference (D)−90°

Figure 12:
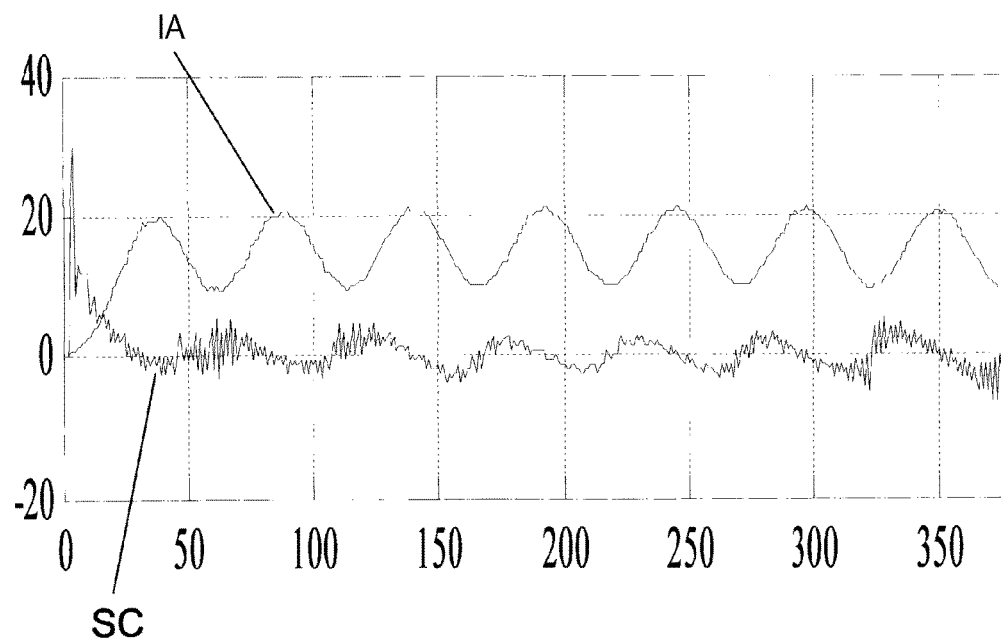

FIG. 12 shows the result of computation a) and d) above based on filtered signal (FS) of FIG. 11:

1) The smooth sinusoid located between amplitudes 10 and 20 represents the instantaneous amplitude (the Module) of filtered signal (FS) (this signal is generated by neutralizing the filter gain and by multiplying the amplitude by 20 to make the diagram more readable)

2) signal centered on 0 is expressed in degrees and represents the control signal (SC); one notices a start-up period for the signal to be centered around zero, which corresponds to the start-up period of the filter; the first 2 values of this signal are forced to 0 to make the diagram more readable)

One notices that, in steady-state operation, control signal (SC) value is almost always less than 5° in absolute value, and that these 5° are a peak value rarely attained.

FIG. 13 shows the result of computation b) and d) above based on filtered signal (FS) of FIG. 11:

1) The rapidly oscillating curve is expressed in degrees and represents instantaneous phase (Argument) of filtered signal (FS)

2) Signal centered on 0 is the same as signal 2) of FIG. 12

FIG. 14 is a zoom on a signal similar to those of FIG. 13, and has the purpose to show the fine structure of curve 1) of FIG. 13, structure which does not appear when many points of the curve are very close one to each other.

Figure 15:
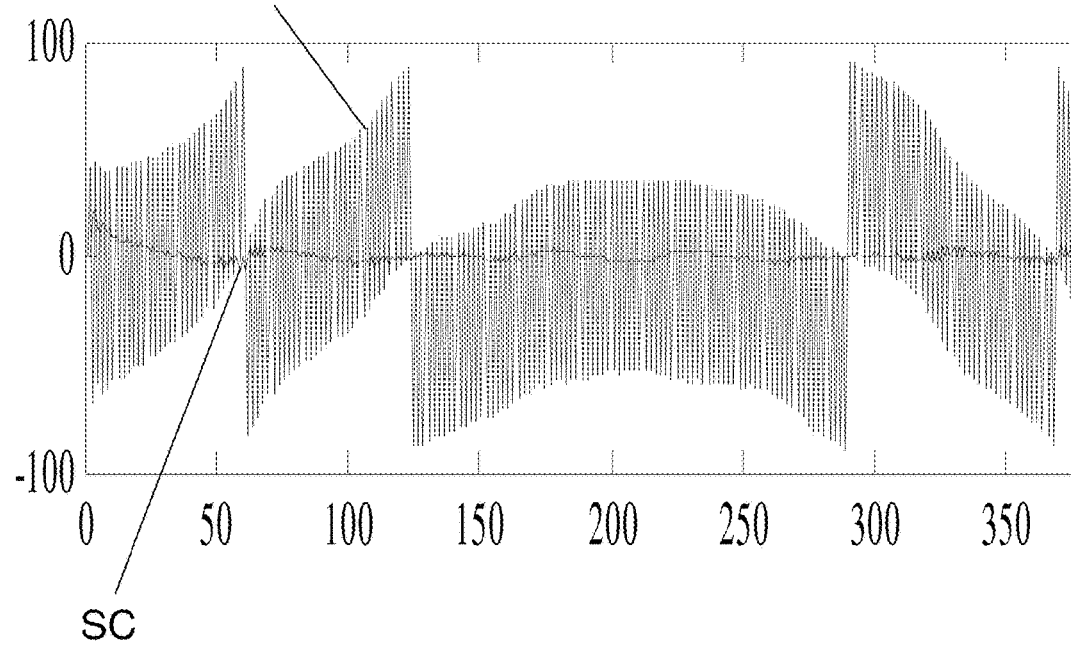

FIG. 15 is the same as FIG. 13, produced with the same operations, and with an input signal (IS) identical to the one of FIG. 7 (the signal used in FIG. 13), with only one difference: initial phase instead of being −30° is 0° in FIG. 15.

One notices that curves 1) of FIGS. 13 and 15 are actually shifted by 30°. These curves 1) of FIGS. 13 and 15 thus effectively show the instantaneous phase of filtered signal (FS). Regarding these curves one also notices that:

difference between two successive values in steady-state operation is very close to 90° this instantaneous phase grows slowly between two successive odd or even samples (even samples correspond to the upper end of the curve and odd samples correspond to the lower end of the curve, or vice-versa)

this phase difference between two successive even or odd samples is the base for the computation of the instantaneous frequency of the signal Indeed if instantaneous phase (IP) of sample N1 is A1 and if instantaneous phase (IP) of sample N2 is A2, instantaneous frequency (IF) is given in degrees, without consideration of sign, by formula:

(IF)=((A2−A1)/(N2−N1))×((SF)/360)

(SF) being the sampling frequency of filtered signal (FS), and one supposes without loss of generality that:
a) N1 and N2 both odd or even and close to each other
b) there are no discontinuities of 90° or of multiples of 90° of instantaneous phase (IP) between A1 and A2

This formula more specifically gives the ability to follow the evolution of instantaneous frequency (IF) of signals of FIGS. 13 and 15. One furthermore notices that:

a) Instantaneous frequency (IF), instantaneous amplitude (IA), and instantaneous phase (IP) can be computed in steady-state operation for each new sample of input signal (IS), which means typically several thousand times a second for types of signals that are analyzed b) it is very easy to compensate the discontinuities of instantaneous phase (IP) because its variations are very small compared to the size of phase discontinuities (90° or 180°)

In practice, advantageously, one computes instantaneous frequency (IF), instantaneous amplitude (IA), and instantaneous phase (IP) only when control signal (SC) has a value close to zero, which allows guaranteeing in particular that the operation is a steady state, and not in a transient state, which is in general little or not well known.

One finally notices that instantaneous frequency (IF), instantaneous amplitude (IA), and instantaneous phase (IP) of filtered signal (FS) on one hand and of input signal (IS) on the other hand are related in a simple way:

a) Instantaneous frequency (IF) of a frequency (FN) of input signal (IS) is equal to the one of the corresponding filtered signal (FS), which can be positive or negative, added with the difference between the frequency (FN) analyzed on one hand and the frequency (F4) on the other end b) Instantaneous amplitude (IA) of a frequency (FN) of the input signal (IS) is equal to the one of the corresponding filtered signal (FS), multiplied by the gain of the filter at the instantaneous frequency (IF) of filtered signal (FS) (this gain is known in advance)

c) Instantaneous phase (IP) of a frequency (FN) of the input signal (IS) is equal to the one of the corresponding filtered signal (FS), up to a constant

13) Parameters that it is Possible to Extract

Previous elements showed how the step (EXP) of extraction of parameters (PARAM) of signal allowed to:

1) Extract following parameters (PARAM) for filtered signal: instantaneous frequency (IF), instantaneous amplitude (IA), instantaneous phase (IP)

2) Establish a link between these same parameters (PARAM) and those of an analyzed frequency (FN) of the input signal (IS)

By choosing adapted analyzed frequencies (FN), for example regularly spaced, it is possible based on previous parameters (PARAM) to compute, by in particular using logarithms, all the information required to compute a real cepstrum (CR) or a complex cepstrum (CC).

Reference 4 shows the possibilities and the relevance of using the notion of instantaneous amplitude and frequency in order to describe the vocal signal.

It is also possible to extract (see below) a Sliding Fourier Transform (STFT) as parameter.

14) Link with Sliding Fourier Transform

In the rest of the document, unless otherwise mentioned, signals and translation operations are complex signals and complex operations.

Reference 2 describes technical aspects as well as examples of application of Sliding Fourier Transform (denominated Short Time Fourier Transform or STFT in that reference), denominated Sliding Fourier Transform (STFT) in the present document.

Analysis of the TFG Considered as a Filtering Operation

FIG. 25, which reproduces FIG. 6.8 of Reference 2, describes the TFG of a real sampled signal x(n) as the result of the action a bank of filters acting in parallel, each branch of the filter comprising the following elements:

a) a filter the impulse response of which is given and depends on the central frequency (fn) of each branch of the filter (supposed to be positive)

b) multiplication of the output signal of the filter by a complex exponential the frequency of which is the opposite (−fn) of filter branch frequency FIG. 24 details the working of each branch of the filter in FIG. 25. In FIG. 25:

w(n) is the time domain window (supposed finite in time and with real coefficients) of the TFG $\exp<-i \times 2 \times PI \times (n/N)>$ is a complex exponential with normalized frequency (fn), n ranging from 0 to N−1, which corresponds to a frequency in Hertz ranging from 0 to ((N−1)/N)×((SF)/2), (SF) being the signal sampling frequency.

FIG. 27 (parts (A) and (B)) explains in the frequency domain the operation of each branch of filter in FIG. 25:

a) Time domain window w(n) corresponds through a Fourier transform to a frequency domain window W(f), typically centered on zero frequency, and thus denominated (W(0) in part (A)

b) Signal to be analyzed can be decomposed as a sum of complex exponentials; one supposes that one of them has a frequency (f), close to a central frequency of one of the filter branches c) Impulse response of the input filter in each branch of filter of FIG. 25 is the time domain product $w(n) \times \exp<-i \times 2 \times PI \times (n/N)>$ d) In the frequency domain this corresponds to the convolution of frequency response W(0) corresponding to w(n) and the frequency of the complex exponential e) it is known that this corresponds to a frequency translation towards frequency (fn) of frequency response W(0), in order to generate W(fn), which is frequency response W(0), shifted to frequency (fn) (operation (1) of part (B))

f) Analyzed signal with frequency (f) is modified in amplitude and in phase, but not on frequency, by frequency response W(fn)

g) This signal modified by frequency response W(fn) is then translated towards frequency zero by multiplication with complex exponential with frequency (−fn) (operation (2) of part (B)).

Analysis of the Invention Seen as a Filtering Operation Similar to the TFG (Complex Signals)

An analysis similar to the previous one can be performed for the invention (part (C) of FIG. 27, which uses the same notations):

a) Complex exponential with frequency (f) is translated (operation (0) of part (C), corresponding to (the frequency translation (FTE) followed by frequency selective filtering (FSO) operation) into complex exponential with frequency (ff), close to (F4) by the frequency translation operation (FTE) that translates frequency (fn) into the frequency (F4)

b) Frequency response of frequency selective filtering operation (FSO), which is performed at the frequency (F4), is designated as W(F4)

c) Analyzed signal with frequency (f) is modified in amplitude and phase, but not in frequency, by frequency response W(F4)

d) This signal modified by frequency response W(F4) can then be translated by a frequency translation operation (TF0)

towards zero frequency by multiplication by the sequence 1, −i, −1, +i, . . . , which is the sequence exp<−i×2×PI×(−¼)> which corresponds to frequency (−F4) (operation (2) of part (C)).

Note: Frequency translation operation (TF0) towards frequency zero via multiplication by sequence is an operation is an operation not previously mentioned, and does not require any multiplication and can be implemented with only s additions and subtractions.

Analysis of the Invention Seen as a Filtering Operation Similar to the TFG (Real Signals)

Previous analyses were relative to complex signals, for which the frequency (F4) can be inside the useful bandwidth of the signal. It is possible to perform such an analysis with real signals, by replacing the complex exponentials by sinusoids with same frequency and by noticing that in that case the frequency (F4) must be outside the useful bandwidth of the signal (which can be obtained by up sampling by 2 the initial signal when the useful bandwidth of the initial signal occupies an important part of the frequency band ranging from zero to half of the sampling frequency):

a) Real sinusoid with frequency (f) is translated (operation (0) of part (C), corresponding to the frequency translation (FTE) followed by frequency selective filtering operation (FSO)) into real sinusoid with frequency (ff), close to (F4) by frequency translation operation (FTE) which translates frequency (fn) into the frequency (F4)

b) Frequency response of frequency selective filtering operation (FSO), which is performed at frequency (F4), is designated W(F4)

c) Analyzed signal with frequency (f) is modified in amplitude and phase, but not in frequency, by frequency response W(F4)

d) This signal modified by frequency response W(F4) can then be translated by a frequency translation operation (TF0) towards zero frequency by multiplication by the sequence 1, 0, −1, 0, . . . , which is the sequence cos(−i×2×PI×(−¼)) which corresponds to frequency (−F4) (operation (2) of part (C)).

Note: Frequency translation operation (TF0) towards frequency zero via multiplication by sequence 1, 0, −1, 0, . . . is an operation is an operation not previously mentioned, and does not require any multiplication and can be implemented with only s additions and subtractions.

Comparison of Previous Analysis of TFG and of the Invention in the Frequency Domain In order to compare in the frequency domain the TFG described in Reference 2 (see FIG. 25) and the invention, we consider the case where the plurality (N) of frequencies (FN) is the set of frequencies (fn) previously defined.

In reference with processes described in FIG. 27, one notices that for a complex exponential with frequency (f) close to a frequency (fn) and differing by frequency (df) relative to this frequency (fn), exp<−i×2×PI×(fn+df)>:

a) For the TFG:

Operation (1) (frequency translation (FTE) followed by frequency selective filtering operation (FSO)) generates the result exp<−i×2×PI×(fn+df)>×(value of W(fn) at a frequency that differs by df from the central frequency W(fn))

Operation (2) (frequency translation (TF0)) generates the result exp<−i×2×PI×(df)>×(value of W(fn) at a frequency that differs by df from the central frequency (fn))

b) For the Invention (with Complex Signals):

Operation (0) generates the result exp<−i×2×PI×(F4+df)>×(value of W(F4) at a frequency that differs by df from the central frequency (F4))

Operation (2) generates the result exp<−i×2×PI×(df)>×(value of W(F4) at a frequency that differs by df from the central frequency (F4))

One thus notices that identical results are generated if frequency responses W(fn) and W(F4) have the same shape and the same values, and only the center frequencies differ c) For the Invention (with Real Signals):

It is possible to perform a computation similar to the one with complex signals by replacing complex exponentials by sinusoids with same frequencies, and by noticing that the frequency (F4) must be outside the useful bandwidth of the signal (which can be obtained by up sampling by 2 the initial signal when the useful bandwidth of the initial signal occupies an important part of the frequency band ranging from zero to half of the sampling frequency), and by noticing that frequency translation operation (FTE) translates frequency (fn) into the frequency (F4), and thus also frequency (f)=(fn)+(df) into the sum frequency (F4)+(df) but also into the difference frequency (F4)−(df)−2×(fn):

Operation (0) (frequency translation (FTE) followed by frequency selective filtering operation (FSO)) generates the result (cos(−i×2×PI×(F4+df))+cos(−i×2×PI×(F4−df−2fn)))×(value of W(F4) at a frequency that differs by df from the central frequency (F4)), result which is in practice equal to cos(−i×2×PI×(F4+df))×(value of W(F4) at a frequency that differs by df from the central frequency (F4)) because of the narrow band filtering operation around (F4)

Operation (2) (frequency translation (TF0)) generates the result (cos(−i×2×PI×(df))+cos(−i×2×PI×(−df−2F4)))×(value W(F4) at a frequency that differs by df from the central frequency (F4))

One notices that frequency 2×(F4) is equal to the frequency (F2), which is half of the sampling frequency, and thus a low pass filtering operation (FB4) with a cut off frequency equal to (F4) will generate the result (cos(−i×2×PI×(df))×(value of W(F4) at a frequency that differs by df from the central frequency (F4))

One thus notices, for complex signals, that when plurality (N) of frequencies (FN) is the set of frequencies (fn) defined above, operations defined in the invention as frequency translations (FTE) and frequency selective filtering (FSO), followed by operations (TF0) of translation towards frequency zero generate the same result as a Sliding Fourier Transform (STFT)

For real signals, when the useful bandwidth of the initial signal occupies an important part of the frequency band ranging from zero to half of the sampling frequency, the result is similar with however the following being necessary:

(before operations (FTE) and FSE)) up sample by a factor 2 the initial signal so as to have the frequency (F4) outside signal useful bandwidth restrict frequencies (fn) that are used to frequencies that are lower to the frequency (F4)

(after operations (FTE) and FSE)) perform a low pass filtering with a cut-off frequency equal to the frequency (F4)

Comparison of Previous Analyses of TFG and the Invention in the Time Domain

Reasoning in the time domain, by comparing impulse responses of the TFG and of the invention leads to the same result.

Computation shows that the impulse response (for an unit impulse applied at time zero) of one of the branches of the filter in FIG. 25 (represented by part (A) of FIG. 24) is the sequence w(n).

One can verify directly this result for the frequency (F4):

The sequence corresponding to the complex exponential for the frequency (F4) is: 1, +i, −1, −i, . . . and for the frequency (−F4) is: 1, −i, −1, +i, . . . .

Impulse response of the filter with impulse response w(n)×exp<i×(F4)> is thus: w(0), −iw(1), −w(2), +iw(3)

The response of this filter after multiplication by the exponential exp<i×(−F4)> is thus w(0), w(1), w(2), w(3)

For the invention (see part (C) of FIG. 27):

One notices that the impulse response of a filter the frequency response of which is centered around the frequency (F4) can be formulated under the form w(n)×exp<i×(F4)>(one can mainly notice that w(n) is the filter frequency response after translation towards zero frequency and that w(n)×exp<i×(F4)> is thus the filter response after new translation towards the frequency (F4))

Operation (2) generates the result exp<−i×2×PI×(df)>×(value of W(F4) at a frequency that differs by df from the central frequency (F4))

Note: One has noticed that with complex signals (which means with (F4) inside the useful bandwidth of the signal) the impulse response for the invention was under the form w(n)×exp<i×(F4)>, identical to the response of the filter which is the first element of the branch of the TFG filter in part (A) of FIG. 24.

One also notices that by translating this complex impulse response into real numbers one obtains the sequence: (w(0), 0), (0,−w(1)), (−w(2),0), (0, +w(3)), . . . which can be decomposed in the following way:

Real part: w(0), 0, −w(2), 0

Imaginary part: 0, −w(1), 0, +w(3)

This impulse response is computed with complex numbers, by operating with a frequency (F4) inside the useful bandwidth of the signal, and thus without up sampling the initial signal.

FIGS. 16 and 17 show two examples of impulse responses (RIP) of the invention for the frequency selective filtering operations (FSO), computed with real signals, operating with a frequency (F4) outside the useful bandwidth of the signal, and thus after up sampling by a factor 2 the initial signal.

By designating as w(n) the envelope of each of the impulse responses (RIP) of FIGS. 16 and 17, and by considering the respective sampling frequencies of FIGS. 16 and 17 on one hand, and by considering the complex signals impulse response on the other hand, one is lead to make the following important remark:

FIGS. 16 and 17 on one hand, and complex signal impulse response for (F4) on the other hand, contain exactly the same information:

a real envelope w(n)

multiplied by the frequency (F4)

With however the following difference:

information concerning the frequency (F4) is as real signals in FIGS. 16 and 17, under the form:

1, 0, −1, 0, 1, 0, −1, 0 . . . .

this same information is as complex signals for the complex signal impulse response under the form: (1,0), (0,−1), (−1,0), (0,+1), . . . .

Inversion Possibilities for TFG

FIG. 26 (which is a copy of FIG. 6.17 of Reference 2) describes, within the framework of the traditional implementation of the TFG, the inversion of the TFG, which means synthesis of the original signal based on the results of the TFG by the method called "Filter Bank Summation (FBS) Method". This method (FBS) consists in cancelling the frequency translation performed at the end of processing of each branch of the filter in FIG. 25 by the complex exponential with frequency (fn) (see also part (A) of FIG. 24) by performing the translation by the complex exponential of opposite frequency, which means with frequency (−fn), and details conditions for applicability of this method depending on the characteristics of the envelope w(n) of the filters that are used.

Within the framework of the invention, it is required to operate in a similar but different way, because of the frequency translation operations (FTE) which have translated the different frequencies (fn) towards the common frequency (F4): it is thus necessary to perform frequency translation operations (TFN) which bring back for each branch of the filter the frequency (F4) towards the initial frequency (fn).

In reference to FIG. 27 and the analysis performed in the section "Comparison of previous analysis of TFC and of the invention in the frequency domain" of this document, for the invention (in complex signals):

Operation (0) generates the result exp<−i×2×PI×(F4+df)>×(value of W(F4) at a frequency that differs by df from the central frequency (F4))

Operation (2) generates the result exp<−i×2×PI×(df)>×(value of W(F4) at a frequency that differs by df from the central frequency (F4))

Within that context, a frequency translation operation (TFN) towards a frequency (fn) implemented by multiplication with a complex exponential with frequency (fn−F4) performed after operation (0) and instead of operation (2) generates the result: exp<−i×2×PI×(F4+df)>×exp<−i×2×PI×(fn−F4)>=exp<−i×2×PI×(fn+df)>, which is the initial frequency before operation (0)

A computation with real signals leads to a similar result, with like in the analysis previously mentioned, the requirement of a low pass filter with a cutoff frequency equal to (F4) in order to recover the initial frequency. One notices that this low pass filter with cutoff frequency (F4) can be shared among all branches of the filter.

One also notes that the required conditions for invertibility and concerning the characteristics of the envelope w(n) are fulfilled by filters used within the framework of the invention, more specifically with windows such as the one in FIG. 27; it thus appears that it is possible to reconstruct the original signal based on filtered signals (FS) generated the present invention.

15) Required Resources and Continuous Operation

It is a known fact that computation of amplitude and argument of a complex number based on its cartesian coordinates can be performed in a very economical way and with fixed point computations with an algorithm of the CORDIC type.

According to the above conditions, all the computations and all the operations required to implement the method, and more specifically the analysis operation (ANA) can be performed with very limited resources, and with a speed adapted to allow a continuous processing of the set of frequencies (FN) of the plurality of frequencies (N).

16) Advantages of the Invention

General Advantages

The method according to the invention thus allows to implement a plurality (N) of frequency selective filters (FS) operating in parallel on this same plurality (N) of distinct frequencies (FN), allowing the extraction of instantaneous frequency (IF), instantaneous amplitude (IA), and instantaneous phase (IP) of filtered signal (FS), and to link them in a simple way to these same parameters for each analyzed frequency (FN) of the input signal (IS).

These parameters can be evaluated once for each new sample of the input signal (IS), which means typically several thousand times a second for an audio signal, and this under the control of a control signal (SC) which gives an indication on the validity of the parameters.

These results are obtained with simple means and with fixed point computations, on platforms that allow implementing embedded systems.

Finally, by using frequency selective filters with linear phase response, it is possible to perform all computations and all operations with delays that are known in advance, and thus allow to precisely locate in time the analyzed input signals (IS).

Comparison of the Nature of Arithmetic Errors

In every computation performed on a physical computing platform, whatever that platform may be, accuracy of computations cannot be infinite. It is thus important to analyze the nature and localization of arithmetic errors in order to be able to evaluate their importance and their impact, which can be very different depending on the nature of these errors.

Within the framework of implementations of the invention using exclusively resonators (RS4) tuned on the frequency (F4), one can notice that:

a) operations performed by the comb filter (CF), operations performed by resonators (RS4) and frequency translation operations (TF0) towards zero frequency are 100% accurate if representations for the intervening numbers have a large enough size b) frequency translation operations (FTE) cannot be 100% accurate, because waveforms of the local oscillator cannot be 100% accurate, even if they can have a very high numerical accuracy Waveforms used in frequency translation operations (FTE) can thus be analyzed as being equal to the exact value of the wave plus a residual error (ERO), the value of which is exactly known, and the two following operations are mathematically equivalent:

Multiply a signal supposed to be exact by a waveform containing a residual error (ERO) known Multiply a waveform supposed to be exact by a signal containing a residual error (ERS), the amplitude of which relative to the one of the signal is equal in a first approximation to the relative amplitude of error (ERO)

One thus notices that, in this context:

a) Arithmetic errors within the framework of the invention consist only in introducing to perform accurate computations based on a signal to which a residual error (ERS) is added b) These residual errors (ERS) can be computed exactly, and depend directly on the accuracy of the waveforms used by the local oscillator for frequency translation operations (FTE), accuracy which can be very high c) There is no error introduced in a feedback path (and which could then accumulate), as it is the case for every resonator tuned on a frequency other than (F4)

d) Thus there is no stability problem with the use of resonators (RS4), although those problems cannot be avoided with the use of resonators tuned on other frequencies One notices for example programmable components of the FPGA type provide integrated multipliers that can rapidly multiply signed numbers with 18 binary digits in their low cost versions.

However in traditional solutions:

For a finite impulse response filter, number of multiplications is higher: one multiplication for each signal sample of each filter coefficient For an infinite impulse response filter, arithmetic errors of the result may be reinjected in the computations (this behavior is more important when the poles of filter are close to the unit circle), and is the reason of the notorious difficulty of error analysis in infinite impulse response filters Quantitative Comparison of the Invention It is possible to compare quantitatively the invention, and more specifically its capacity to compute a Sliding Fourier Transform (STFT), by computing a Sliding DFT (see section 13.18 of Reference 1), which is the computation, for a given frequency and for each new sample of an input signal, of the updated value of a Sliding Fourier Transform (STFT).

The objective is to perform the computation, performed with complex numbers, in the most economical way, especially regarding the numbers of real additions and multiplications. Measurements will be relative to numbers of real additions and of multiplications required to compute a new value of the Fourier Transform following the arrival of a new sample of the input signal.

Comparison will be relative to architectures that can have practical applications:

For the Sliding DFT: a device with 3 resonators allowing to implement with frequency domain means a time domain Hamming window (around 45 dB difference with secondary lobes), in its "guaranteed stable" version, which means guaranteed stable; see FIGS. 13-50 and 13-49 of Reference 1 for a description of the device For the invention: 2 structures having characteristics similar to the Hamming window concerning separation with the secondary lobes, also in guaranteed stable versions:

a) A structure equivalent to 3 resonators in parallel, close to the one in FIG. 13-50 of Reference 1, implemented according to the architecture described in part (B) of FIG. 23, and with the same Hamming window generated with the same frequency domain means (same computations and same coefficients)

b) A structure with a Gaussian time domain window, implemented according to the architecture described in FIG. 21, with a cascade of 4 comb filters (CF) in series with a cascade of 4 resonators (RS4). Separation with the secondary lobes is around 53 dB. (a similar structure with a cascade of 3 comb filters (CF) and 3 resonators (RS4) has a separation with the secondary lobes of around 40 dB. Impulse response of the cascade of the 4 comb filters (CF) and 4 resonators (RS4) is similar to the one described in FIG. 17.

One notices (see previous section "Comparison of the nature of arithmetic errors") that there is no need for coefficient r of the Sliding DFT of Reference 1 in order to implement stable versions.

FIG. 28 is a table comparing numbers of operations required to update the Sliding Fourier Transform in the different implementations.

Numbers indicated in Reference 1 (Table 13-5) are 19 real multiplications and 14 real additions.

Numbers of operations have been computed in the following way for structure a) of the invention equivalent to 3 resonators in parallel:

Comb filter (real signal): 1 Addition

Frequency translation (FTE) towards the frequency (F4) (real signal): 2 Multiplications (1 sinus+1 cosinus)

Resonators (RS4) tuned on the frequency (F4): Multiplication by 0,+1,−1 of real and imaginary parts, and addition: 2 real Additions and 3 resonators: 6 Additions Frequency translations (FTD) and (FTC): 2 real multiplications for each frequency translation, and 4 frequency translations (one notices that at the frequency (F4) one or the signal real or imaginary parts is always equal to zero) which is 8

Multiplications

Multiplication by 3 real coefficients after the resonators: 6 Multiplications

Sum of 3 complex numbers (2 additions): 4 Additions

Frequency translation (TF0) towards frequency (Zero): Multiplication par 0,+1,−1 of real and imaginary parts, and addition: 2 real Additions (only for the central resonator (RS4))

Numbers of operations have been computed in the following way for structure b) of the invention with a cascade of 4 comb filters (CF) and 4 resonators (RS4):

Comb filter: 1 real Addition for each filter; no multiplication in this case, because no need of coefficient r because computations with resonator (RS4) are exact Frequency translation (FTE) towards the frequency (F4): 2 Multiplications (1 sinus+1 cosinus)

Resonators (RS4) tuned on the frequency (F4): Multiplication by 0,+1,−1 of real and imaginary parts, and addition: 2 real Additions Frequency translation (TF0) towards frequency (Zero): Multiplication by 0,+1,−1 of real and imaginary parts, and addition: 2 real Additions Total Numbers are the Following:

a) Sliding DFT of Reference 1: 19 Multiplications+14 Additions b) Structure according to the invention equivalent to 3 resonators in parallel: 16 Multiplications+9 Additions c) Structure with a Gaussian time domain window (4 Comb Filters+4 Resonators (RS4): 2 Multiplications+14 Additions d) Structure a Gaussian time domain window (3 Comb Filters+3 Resonators (RS4): 2 Multiplications+11 Additions One notices the important role played by utilizing resonator (RS4) in order to obtain gains in the number of multiplications:

For the structure equivalent to 3 resonators in parallel, on purpose close to the traditional structure, a decrease of around 20% for multiplications and of 33% for additions, despite the frequency translation operations (FTE) and (TF0) specific to the invention Exclusive use of resonators (RS4) in the structure with a Gaussian time domain window is enough to obtain a very important gain in terms of multiplications despite the frequency translation operations (FTE) and (TF0) specific to the invention Preferred Computing Platforms (CP)

It is known that some types of filters, such as comb filters and recursive implementations of filters for computing averages (which are close) are preferably implemented with computations using integers, which means fixed point computations. Resonators (RS4) tuned on the frequency (F4) are also adapted to compute with integer numbers.

As a consequence, implementation of the invention can be advantageously performed with fixed point computations, especially in case of exclusive use of resonators (RS4) tuned on the frequency (F4).

The invention claimed is:

1. A method for selective filtering in the frequency domain, the method comprising the following steps:
a) performing preprocessing operations by a sampling device sampling an input signal with a sampling frequency to provide samples, the input signal having a frequency band of the input signal contained between a minimum frequency and a maximum frequency, in order to transform samples of the input signal into a sample sequence;
b) performing a plurality of frequency translation operations, each of the frequency translation operations performed by a multiplication of the sample sequence by a signal from a local oscillator on a respective frequency in the plurality of distinct frequencies to change the frequency to a frequency F4 equal to a quarter of the sampling frequency, in order to generate a plurality of signals translated in frequency;
c) performing a plurality of frequency selective filtering operations, each of the frequency selective filtering operations performed by one of a plurality of frequency selective filters at the frequency F4 on a respective signal in the plurality of signals translated in frequency, the plurality of frequency selective filters operating in parallel on a plurality of distinct frequencies, each frequency selective filter having a pass band, in order to generate a plurality of filtered signals, each having a frequency bandwidth centered at the frequency F4, including:
performing a prefiltering step operating on the input signal before performing the frequency translation operations, using one of a comb filter or a sequence of comb filters, and
performing a frequency domain filtering step operating on each of the plurality of signals translated in frequency, using a plurality of resonators each tuned on the frequency F4, wherein:
i) for each one of the plurality of distinct frequencies, the number of comb filters in the sequence of comb filters is equal to the number of resonators in the plurality of resonators,
ii) the frequency zeroes of the comb filters include each of the plurality of frequencies, and
iii) each of the plurality of frequency translation operation changes the frequency zeroes of the comb filter into the frequency F4 of the resonators;
the method further comprising:
d) performing a plurality of extraction operations by executing a calculus formula to extract respective parameters from the plurality of filtered signals, including, for each of the plurality of filtered signals, estimating at least one of: (i) instantaneous phase, (ii) instantaneous amplitude, (iii) instantaneous frequency, or (iv) Sliding Fourier Transform.

2. The method according to claim 1, wherein performing the preprocessing operations comprises frequency domain filtering and/or an up sampling to limit the maximum frequency of the input signal to a maximum frequency less than the frequency F4.

3. The method according to claim 1, wherein implementing the Sliding Fourier Transform includes performing a second plurality of frequency translation operations, operating on the plurality of filtered signals having a frequency bandwidth (BF) centered on the frequency F4, each of the frequency translation operations performed to translate the frequency F4 into zero frequency.

4. The method according to claim 1 wherein second resonators, tuned on frequencies FD close to the frequency F4, operate in parallel with a first resonator so as to implement time domain windowing in frequency domain.

5. The method according to claim 1 wherein performing the plurality of frequency translation operations includes using a plurality of resonators.

6. The method according to claim 1 wherein performing the frequency selective filtering operations includes using the frequency selective filters with a bandwidth selected so that each of the plurality of filtered signals contains only one frequency domain component of the input signal.

7. The method according to claim 1 including measuring the instantaneous frequency of a respective one of the plurality of filtered signals using the difference of successive measures of the instantaneous phase of the filtered signal.

8. The method according to claim 1 wherein each of the steps a)-d) are executed with a speed adapted to allow a continuous processing of all of the plurality of frequencies.

9. A signal analysis device comprising:
   a) a sensor generating an initial signal;
   b) a computing platform connected to the sensor and adapted to implement the method according to claim 1.

10. The device according to claim 9 wherein the computing platform (PC) performs fixed point computations.

* * * * *